United States Patent
Arai et al.

(10) Patent No.: US 7,817,330 B2
(45) Date of Patent: Oct. 19, 2010

(54) PROJECTION APPARATUS WITH ADJUSTABLE LIGHT SOURCE

(75) Inventors: Kazuma Arai, Tokyo (JP); Yoshihiro Maeda, Tokyo (JP); Fusao Ishii, Pittsburgh, PA (US)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 186 days.

(21) Appl. No.: 12/286,807

(22) Filed: Oct. 1, 2008

(65) Prior Publication Data

US 2009/0102828 A1 Apr. 23, 2009

Related U.S. Application Data

(60) Provisional application No. 60/997,433, filed on Oct. 2, 2007.

(51) Int. Cl.
| G02B 26/00 | (2006.01) |
| G02F 1/03 | (2006.01) |
| G02F 1/00 | (2006.01) |
| G09G 5/00 | (2006.01) |
| G09G 3/34 | (2006.01) |

(52) U.S. Cl. .................. 359/290; 359/298; 359/245; 359/264; 345/84; 345/89; 345/204; 345/214; 345/690; 345/691; 348/750; 348/758; 348/771

(58) Field of Classification Search ......... 359/290–295, 359/298, 237–239, 221.2, 245, 264, 315, 359/316; 353/31, 33, 85, 121; 345/84, 89, 345/90, 204, 213, 214, 690, 691; 348/656, 348/708, 742, 754–756, 758, 759, 750, 771, 348/E5.137, E5.142, E9.027; 219/121.73
See application file for complete search history.

(56) References Cited

U.S. PATENT DOCUMENTS

| 4,229,732 A | 10/1980 | Hartstein et al. |
| 4,769,713 A | 9/1988 | Yasui |
| 5,192,946 A | 3/1993 | Thompson et al. |
| 5,214,420 A | 5/1993 | Thompson et al. |
| 5,287,096 A | 2/1994 | Thompson et al. |
| 5,448,314 A | 9/1995 | Heimbuch et al. |
| 5,589,852 A | 12/1996 | Thompson et al. |
| 5,617,243 A | 4/1997 | Yamazaki et al. |
| 5,619,228 A | 4/1997 | Doherty |
| 5,668,611 A | 9/1997 | Ernstoff et al. |
| 5,767,828 A | 6/1998 | McKnight |
| 5,917,558 A | 6/1999 | Stanton |
| 5,986,640 A | 11/1999 | Baldwin et al. |

(Continued)

*Primary Examiner*—Loha Ben
(74) *Attorney, Agent, or Firm*—Bo-In Lin

(57) ABSTRACT

A projection apparatus includes a light source for emitting a light including at least two different wavelengths; a light source control circuit for controlling a light source to emit the light as pulse emissions with a pulse modulation control; at least two spatial light modulators each comprises plurality of pixel elements are arranged in an array; a spatial light modulator control circuit for selectively controlling a modulation state of the respective pixel elements in each of the spatial light modulators in accordance with image data corresponding to the respective pixel elements; and the light source control circuit controls the light source so that a starting time of a pulse emission period of the pulse emissions of at least one of the wavelengths emitted from the light source is different from a modulation control timing of the pixel element of the spatial light modulator.

28 Claims, 34 Drawing Sheets

U.S. PATENT DOCUMENTS

| | | | |
|---|---|---|---|
| 6,008,929 A * | 12/1999 | Akimoto et al. | 359/264 |
| 6,232,963 B1 | 5/2001 | Tew et al. | |
| 6,975,366 B2 | 12/2005 | Flint | |
| 7,154,458 B2 | 12/2006 | Nakanishi | |
| 7,232,224 B2 | 6/2007 | Penn | |
| 7,232,227 B2 | 6/2007 | Yamasaki et al. | |
| 7,317,464 B2 * | 1/2008 | Willis | 345/691 |
| 2006/0285136 A1 | 12/2006 | Shin et al. | |
| 2007/0035488 A1 | 2/2007 | Kimura | |
| 2007/0200806 A1 | 8/2007 | Vestal et al. | |

* cited by examiner

Gray scale N bit ≧ n
$I_1$ = a first current for $I_{th}$ and LSB
$I_2$ = a first current for LSB+1
$I_3$ = a first current for LSB+2
  .
  .
$I_n$ = a first current for MSB

- non SW: $P_b = k \times I_b \fallingdotseq 0$ [mW]  ($I_b \fallingdotseq I_{th}$)
- $SW_1$: $P_1 = k \times (I_b + I_1)$
- $SW_2$: $P_2 = k \times (I_b + I_1 + I_2)$
  .
  .
- $SW_n$: $P_n = k \times (I_b + I_1 + I_2 + \cdots + I_{n-1} + I_n)$

PROJECTION APPARATUS WITH ADJUSTABLE LIGHT SOURCE

CROSS REFERENCE TO RELATED APPLICATIONS

This application is a Non-provisional application claiming a Priority date of Oct. 2, 2007 based on a previously filed Provisional Application 60/997,433 and a Non-provisional patent application Ser. No. 11/121,543, filed on May 3, 2005, issued into U.S. Pat. No. 7,268,932. The application Ser. No. 11/121,543 is a Continuation-In-Part (CIP) Application of three previously filed Applications. These three Applications are: Ser. No. 10/698,620, filed on Nov. 1, 2003, now abandoned; Ser. No. 10/699,140, filed on Nov. 1, 2003, now issued into U.S. Pat. No. 6,862,127; and Ser. No. 10/699,143, filed on Nov. 1, 2003, now issued into U.S. Pat. No. 6,903,860. The disclosures made in these patent applications are hereby incorporated by reference in this patent application.

BACKGROUND OF THE INVENTION

1. Field of the Invention

The present invention relates generally to a projection system configuration and methods for controlling and operating a projection apparatus. More particularly, this invention relates to an image projection apparatus implemented with a light source with different emission light wavelengths and a plurality of spatial light modulators (SLMs) and control circuits to control the pulse emissions of the light source and the modulation states of the spatial light modulators.

2. Description of the Related Art

Even though there have been significant advances made in recent years in the technologies of implementing electromechanical micromirror devices as spatial light modulators (SLM), there are still limitations and difficulties when they are employed to display high quality images. Specifically, when the display images are digitally controlled, the quality of the images is adversely affected because the images are not displayed with a sufficient number of gray scale gradations.

An electromechanical mirror device is drawing a considerable interest as a spatial light modulator (SLM). The electromechanical mirror device consists of a mirror array arranging a large number of mirror elements. In general, the number of mirror elements ranges from 60,000 to several millions and the minor elements are arranged on the surface of a substrate in an electromechanical mirror device.

Referring to FIG. 1A, an image display system 1 including a screen 2 is disclosed in a relevant U.S. Pat. No. 5,214,420. A light source 10 is used to generate light beams to project illumination for the display images on the display screen 2. The light 9 projected from the light source is further concentrated and directed toward lens 12 by way of mirror 11. Lenses 12, 13 and 14 form a beam columnator operative to columnate the light 9 into a column of light 8. A spatial light modulator 15 is controlled by a computer through data transmitted over data cable 18 to selectively redirect a portion of the light from path 7 toward lens 5 to display on screen 2. FIG. 1B shows a SLM 15 that has a surface 16 that includes an array of switchable reflective elements 17, 27, 37, and 47, each of these reflective elements is attached to a hinge 30. When the element 17 is in an ON position, a portion of the light from path 7 is reflected and redirected along path 6 to lens 5 where it is enlarged or spread along path 4 to impinge on the display screen 2 to form an illuminated pixel 3. When the element 17 is in an OFF position, the light is reflected away from the display screen 2 and, hence, pixel 3 is dark.

The on-and-off states of the micromirror control scheme, as that implemented in the U.S. Pat. No. 5,214,420 and in most conventional display systems, impose a limitation on the quality of the display. Specifically, applying the conventional configuration of a control circuit limits the gray scale gradations produced in a conventional system (PWM between ON and OFF states), limited by the LSB (least significant bit, or the least pulse width). Due to the ON-OFF states implemented in the conventional systems, there is no way of providing a shorter pulse width than the duration represented by the LSB. The least quantity of light, which determines the gray scale, is the light reflected during the least pulse width. The limited levels of the gray scale lead to a degradation of the display image Specifically, FIG. 1C exemplifies, as related disclosures, a circuit diagram for controlling a micromirror according to U.S. Pat. No. 5,285,407. The control circuit includes memory cell 32. Various transistors are referred to as "M*" where "*" designates a transistor number and each transistor is an insulated gate field effect transistor. Transistors M5, and M7 are p-channel transistors; transistors M6, M8, and M9 are n-channel transistors. The capacitances C1 and C2, represent the capacitive loads in the memory cell 32. The memory cell 32 includes an access switch transistor M9 and a latch 32a based on a Static Random Access switch Memory (SRAM) design. All access transistors M9 on a Row line receive a DATA signal from a different Bit-line 31a. The particular memory cell 32 is accessed for writing a bit to the cell by turning on the appropriate row select transistor M9, using the ROW signal functioning as a Word-line. Latch 32a consists of two cross-coupled inverters M5/M6 and M7/M8, which permit two stable states that include a state 1 when Node A is high and Node B is low, and a state 2 when Node A is low and Node B is high.

The dual-state switching, as illustrated by the control circuit, controls the micromirrors to position either at an ON or an OFF orientation, as that shown in FIG. 1A. The brightness, i.e., the gray scales of display for a digitally control image system, is determined by the length of time the micromirror stays at an ON position. The length of time a micromirror is controlled at an ON position is in turned controlled by a multiple bit word. For simplicity of illustration, FIG. 1D shows the "binary time intervals" when controlled by a four-bit word. As shown in FIG. 1D, the time durations have relative values of 1, 2, 4, 8 that in turn define the relative brightness for each of the four bits, where 1 is for the least significant bit and 8 is for the most significant bit. According to the control mechanism as shown, the minimum controllable differences between gray scales is a brightness represented by a "least significant bit" that maintains the micromirror at an ON position.

When adjacent image pixels are shown with a great degree of difference in the gray scales, due to a very coarse scale of controllable gray scale, artifacts are shown between these adjacent image pixels. That leads to image degradations. The image degradations are especially pronounced in the bright areas of display, where there are "bigger gaps" between gray scales of adjacent image pixels. The artifacts are generated by technical limitations in that the digitally controlled display does not provide sufficient gray scales. At the bright areas of the display, the adjacent pixels are displayed with visible gaps of light intensities.

As the mirrors are controlled to operate in either ON or OFF, the intensity of light of a displayed image is determined by the length of time each mirror is in the ON position. In order to increase the number of gray scales of a display, the switching speed of the ON and OFF positions for the mirror must be increased. Therefore the digital control signals need be increased to a higher number of bits. However, when the switching speed of the mirror deflection is increased, a stronger hinge for supporting the mirror is necessary to sustain the required number of switches between the ON and OFF positions for the mirror deflection. In order to drive the mirrors with a strengthened hinge, a higher voltage is required. The higher voltage may exceed twenty volts and may even be as high as thirty volts. The mirrors produced by applying the CMOS technologies are probably not appropriate for operating the mirror at such a high range of voltages, and therefore DMOS mirror devices may be required. In order to achieve a higher degree of gray scale control, more complicated production processes and larger device areas are required to produce the DMOS mirror. Conventional mirror controls are therefore faced with a technical problem in that accuracy of gray scales and range of the operable voltage have to be sacrificed for the benefits of a smaller image display apparatus.

There are many patents related to light intensity control. These patents include U.S. Pat. Nos. 5,589,852; 6,232,963; 6,592,227; 6,648,476, and 6,819,064. There are further patents and patent applications related to different light sources. These Patents and patent applications include U.S. Pat. Nos. 5,442,414 and 6,036,318, and Application 20030147052. Also, U.S. Pat. No. 6,746,123 has disclosed particular polarized light sources for preventing the loss of light. However, these patents or patent applications do not provide an effective solution to attain a sufficient number of the gray scale in the digitally controlled image display system.

Furthermore, there are many patents related to spatial light modulation including U.S. Pat. Nos. 2,025,143; 2,682,010; 2,681,423; 4,087,810; 4,292,732; 4,405,209; 4,454,541; 4,592,628; 4,767,192; 4,842,396; 4,907,862; 5,214,420; 5,287,096; 5,506,597, and 5,489,952. However, these inventions have not provided direct resolution to overcome the above-discussed limitations and difficulties.

Therefore, a need still exists in the art of image display systems, applying digital control of a micromirror array as a spatial light modulator, for new and improved systems such that the difficulties and limitations discussed above can be resolved.

A projection apparatus may be implemented with a single spatial light modulator as a single-panel projection apparatus, Since lights of the different colors for projection on the screen according to a color sequential display method for switching projection of different colors using a time division method, a color display using a single-panel projection apparatus may cause a color break phenomenon.

On the other hand, when performing a color display by a multi-panel projection apparatus, such as a three-panel projection apparatus, a color break usually does not occur since there is no need to switch between the lights of the different colors (for example, red (R), green (G) and blue (B)) to be projected on the screen using a time division method. However, even under such conditions, a situation may occur in which the light of one of the colors is projected on the screen for a relatively long period, depending on the content of image data of each color. In such a case, a color break may still occur, in the same manner as with the single-panel projection apparatus.

SUMMARY OF THE INVENTION

In consideration of the facts noted above, an aspect of the present invention is to provide a system configuration and control process to minimize the occurrence of color breaks in a projection apparatus comprising a light source with different emission light wavelengths and a plurality of spatial light modulators.

In order to reduce the above-discussed color break effects, an apparatus according to the first embodiment of the present invention is configured as a projection apparatus using a spatial light modulator (SLM), including a light source to emit a light includes at least two different wavelengths, a light source control circuit to control the light source to emit pulse emissions with a pulse modulation control. The apparatus further includes at least two spatial light modulators comprising a plurality of pixel elements arranged in an array and controlled by a spatial light modulator control circuit that selectively controls a modulation state of the respective pixel elements in each of the spatial light modulators, in accordance with image data corresponding to the respective pixel elements. The light source control circuit controls the light source to project the pulse emissions of at least one of the wavelengths with a starting timing of a pulse emission period that is different from a modulation control timing of the pixel element of the spatial light modulator.

An apparatus according to the second embodiment of the present invention is configured as a projection apparatus using a spatial light modulator (SLM), including a light source projecting An apparatus according to the second embodiment of the present invention is configured a light including at least two different wavelengths controlled by a light source control circuit to emit pulse emissions with a pulse modulation control. The apparatus further includes at least two spatial light modulators each includes a plurality of pixel elements arranged in an array and controlled by a spatial light modulator control circuit to selectively control a modulation state of the respective pixel elements in each of the spatial light modulators in accordance with image data corresponding to the respective pixel elements. The light source control circuit controls both the turn-on timing and a turn-off timing, or either the turn-on timing or the turn-off timing of a pulse emission of at least one of the wavelengths, wherein the turn-on timing and/or the turn-off timing are/is different from a modulation control timing of the pixel element of the spatial light modulator.

BRIEF DESCRIPTION OF THE DRAWINGS

The present invention is described in detail below with reference to the following Figures.

DESCRIPTION OF THE PREFERRED EMBODIMENT

Hereinafter, exemplary embodiments of the present invention are described in reference to the drawings.

A projection apparatus according to the first embodiment of the present invention includes a light source for projecting a light that includes at least two different wavelengths and controlled by a light source control circuit for to project pulse emissions under a pulse modulation control. The projection apparatus further includes at least two spatial light modulators (SLMs) comprises a plurality of pixel elements arranged in an array controlled by a spatial light modulator control circuit to selectively control the modulation state of the respective pixel elements in each of the spatial light modulators in accordance with image data corresponding to the respective pixel elements.

A projection apparatus according to this embodiment may be configured as a three-panel projection apparatus and a two-panel projection apparatus. Specifically, the exemplary embodiments for the projection apparatus according to the present invention may be implemented as a three-panel projection apparatus described, in reference to FIG. 2A, FIG. 2B, FIG. 3A, FIG. 3B, FIG. 4A, FIG. 4B, FIG. 5, FIG. 6 and FIG. 7, and a configuration example as a two-panel projection apparatus is described, in reference to FIG. 8A, FIG. 8B, FIG. 8C, FIG. 8D, FIG. 9, FIG. 10, and FIG. 11.

Figure 1A:
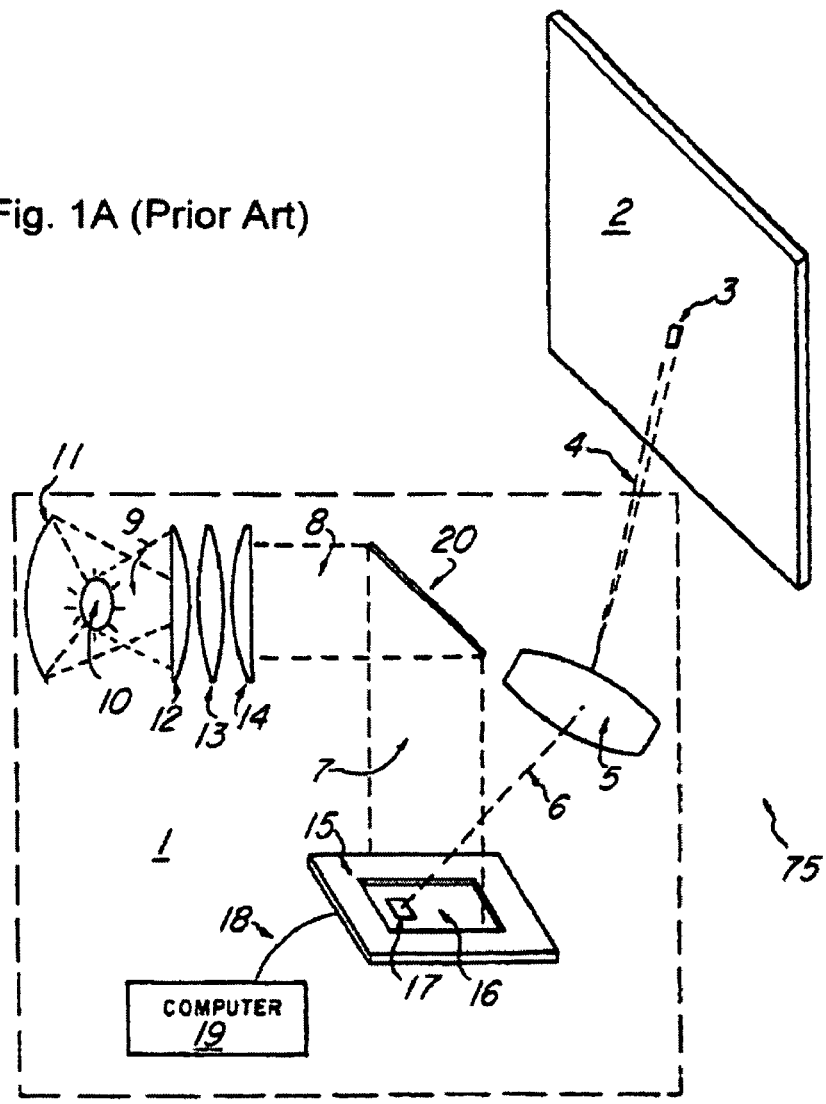
FIG. 1A is a functional block diagram showing the configuration of a projection apparatus according to a conventional technique.
Figure 1B:
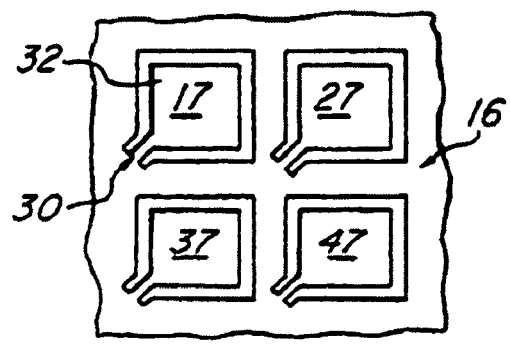
FIG. 1B is a top view diagram showing the configuration of a mirror element of a projection apparatus according to a conventional technique.
Figure 1C:
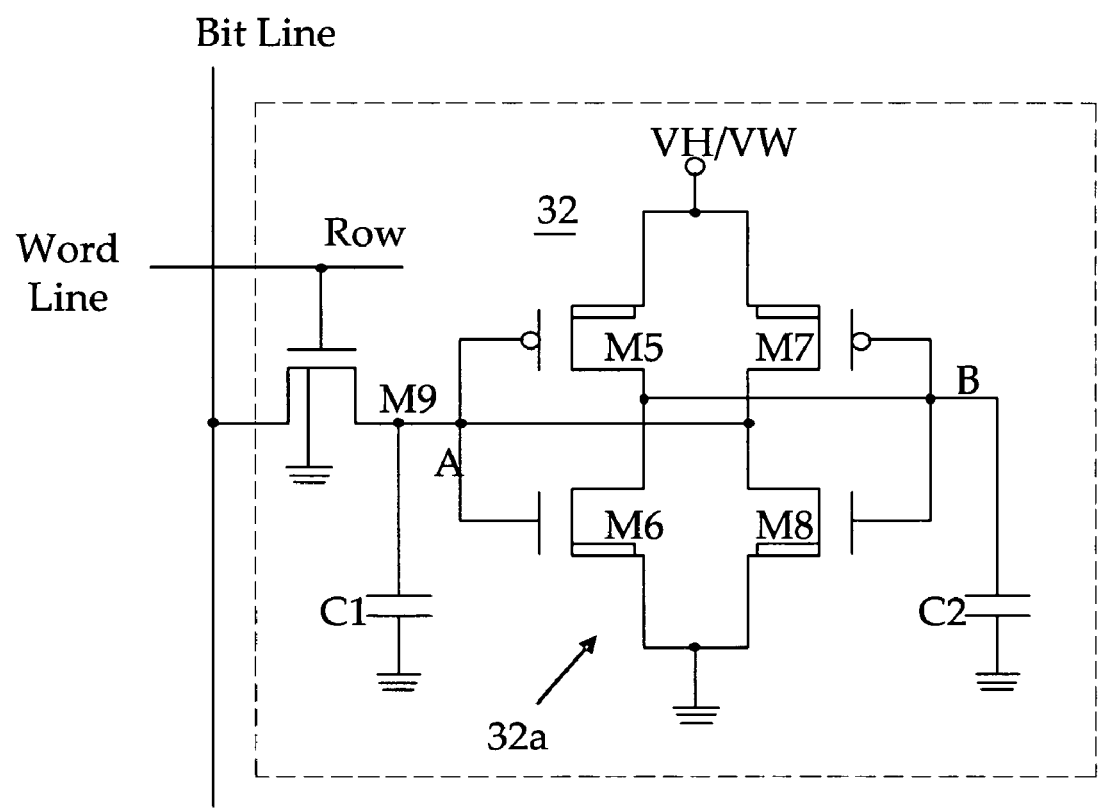
FIG. 1C is a circuit diagram showing the configuration of the drive circuit of a mirror element of a projection apparatus according to a conventional technique.
Figure 1D:
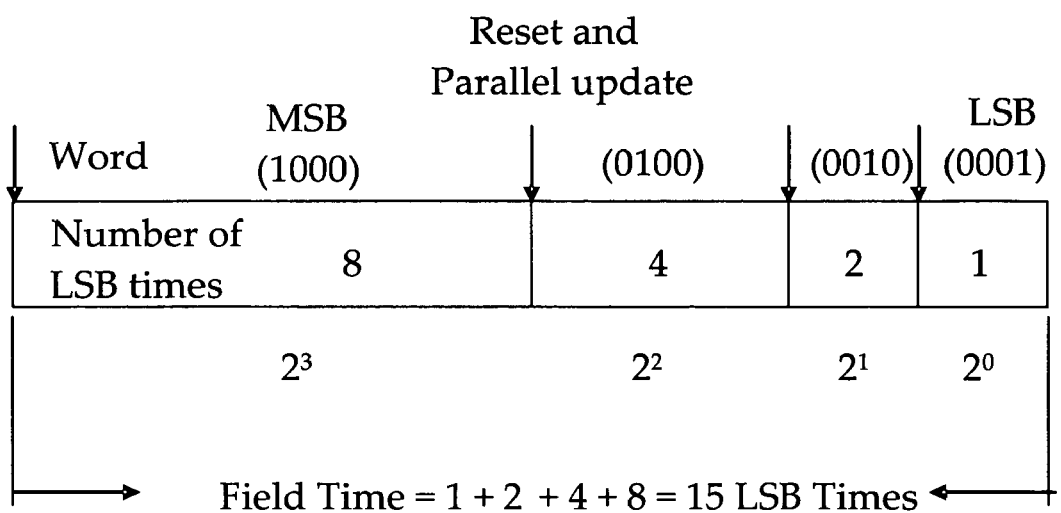
FIG. 1D is a timing diagram showing the mirror control time schemes according to the image data format used in a projection apparatus according to a conventional technique.
Figure 2A:
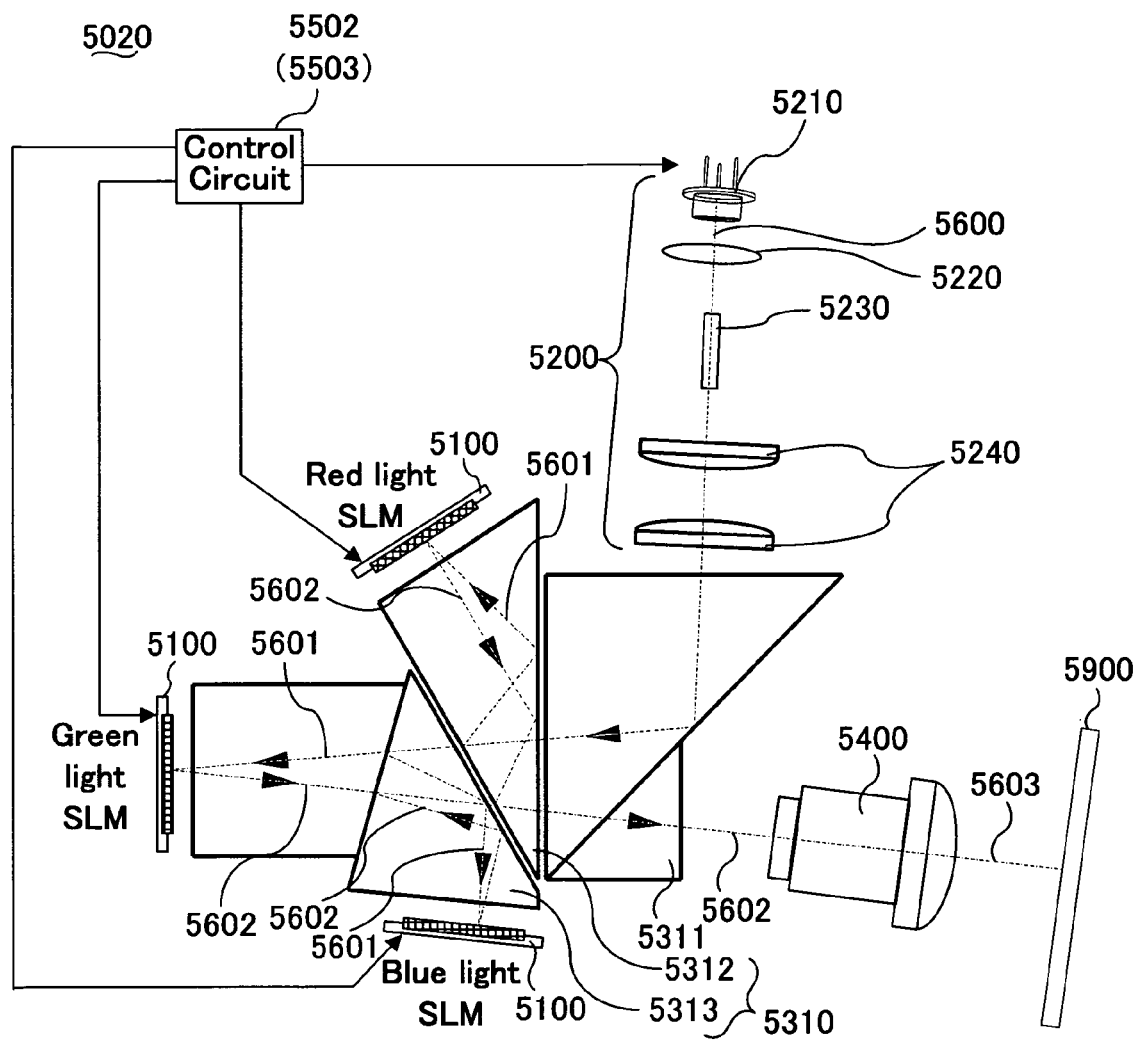
FIG. 2A is a functional block diagram showing the configuration of a three-panel projection apparatus according to an embodiment of the present invention.

FIG. 2A is a functional block diagram for showing a three-panel projection apparatus according to the present embodiment. A projection apparatus 5020 shown in FIG. 2A comprises a light source optical system 5200, three spatial light modulators (SLMs) 5100, a control unit 5502, a light separation/synthesis optical system 5310, and a projection optical system 5400. The light source optical system 5200 comprises a adjustable light source 5210 for generating an illumination light 5600, a condenser lens 5220 for focusing the illumination light 5600, a rod type condenser body 5230 and a condenser lens 5240. The adjustable light source 5210, condenser lens 5220, rod type condenser body 5230 and condenser lens 5240 are sequentially placed in the aforementioned order in the optical axis of the illumination light 5600, emitted from the adjustable light source 5210 and incident to the side face of the light separation/synthesis optical system 5310 (a TIR prism 5311 will be described below). The light separation/synthesis optical system 5310 is disposed between a projection optical system 5400 and each of the spatial light modulators 5100, and comprises a plurality of TIR prisms, i.e., a TIR prism 5311, a TIR prism 5312 and a TIR prism 5313.

The TIR prism 5311 carries out the function of directing the illumination light 5600 projected along the optical axis of the projection optical system 5400 and directs the light to the spatial light modulator 5100 as incident light 5601.

The TIR prism 5312 carries out the function of separating red (R) light from an incident light 5601, projected by way of the TIR prism 5311, transmits the red light to the spatial light modulators for the red light 5100. The TIR prism 5312 further carries out the function of directing the reflection light 5602 of the red light to the TIR prism 5311.

Likewise, the prism 5313 carries out the functions of separating blue (B) and green (G) lights from the incident light 5601 projected by way of the TIR prism 5311, and directs the light to the blue color-use spatial light modulators 5100 and green color-use spatial light modulators 5100, and further carries out the function of directing the reflection light 5602 of the green light and blue light to the TIR prism 5311.

Therefore, three spatial light modulators 5100 simultaneously carry out the spatial light modulations of these three colors, R, G and B. The reflection light 5602, resulting from the respective modulations, is projected onto the screen 5900 as the projection light 5603 by way of the projection optical system 5400, and thus a color display is carried out.

Note that the system may implement various modifications by using a light separation/synthesis optical system instead of the light separation/synthesis optical system 5310 described above.

Figure 2B:
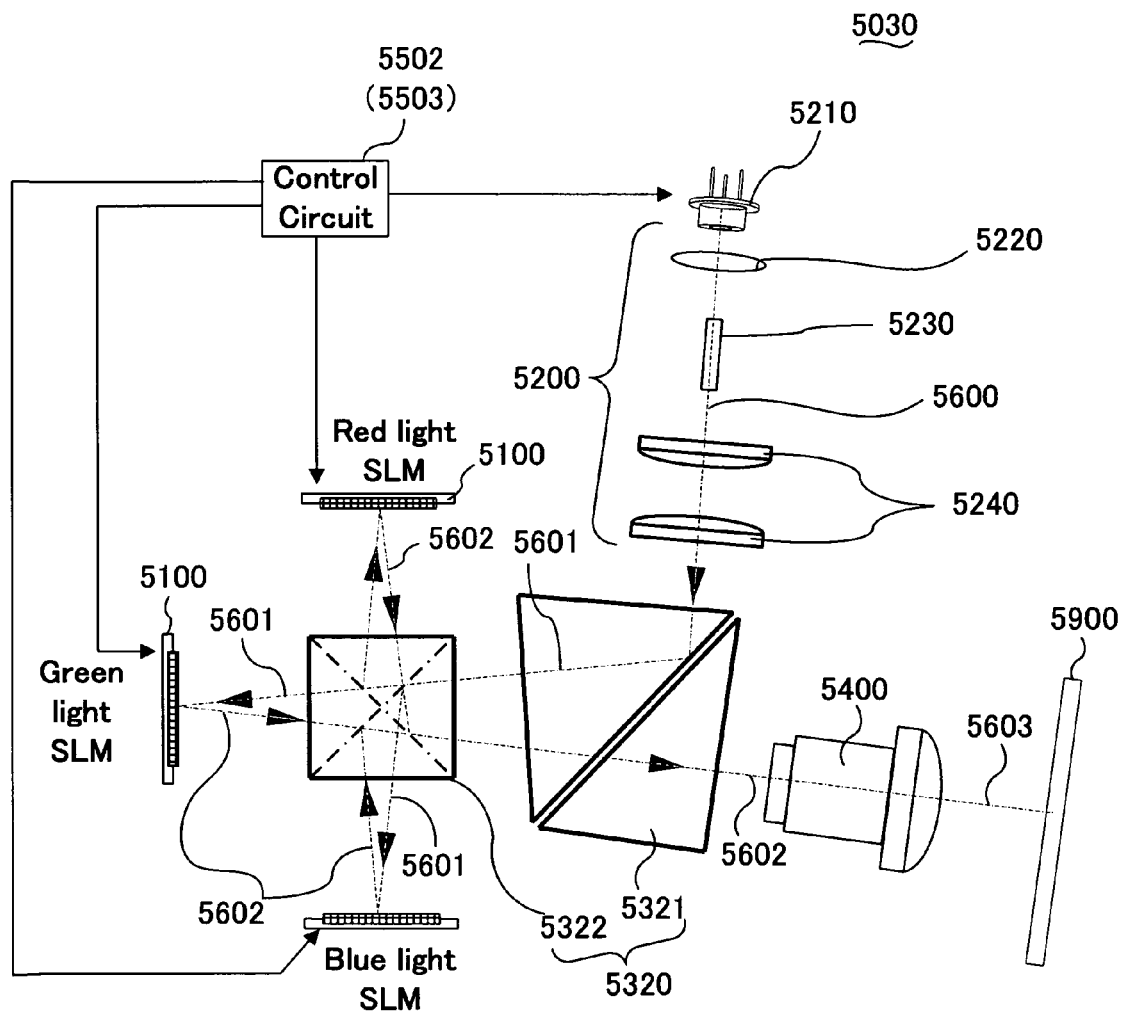
FIG. 2B is a functional block diagram showing a modified example of the configuration of a three-panel projection apparatus according to an embodiment of the present invention.

FIG. 2B is a diagram showing a modified example of the three-panel projection apparatus according to the present embodiment. The modified example comprises a light separation/synthesis optical system 5320 in place of the above described light separation/synthesis optical system 5310. The light separation/synthesis optical system 5320 comprises a TIR prism 5321 and a cross-dichroic mirror 5322.

The TIR prism 5321 functions to direct an illumination light 5600, incident from the lateral direction of the optical axis of the projection optical system 5400, towards the spatial light modulators 5100 as incident light 5601.

The cross dichroic mirror 5322 has the function of separating red, blue and green lights from the incident light 5601, incoming from the TIR prism 5321, making the incident lights 5601 of the three colors enter the red-use, blue-use and green-use spatial light modulators 5100, respectively, and also converging the reflection lights 5602, reflected by the respective color-use spatial light modulators 5100, and directing it towards the projection optical system 5400.

Figure 3A:
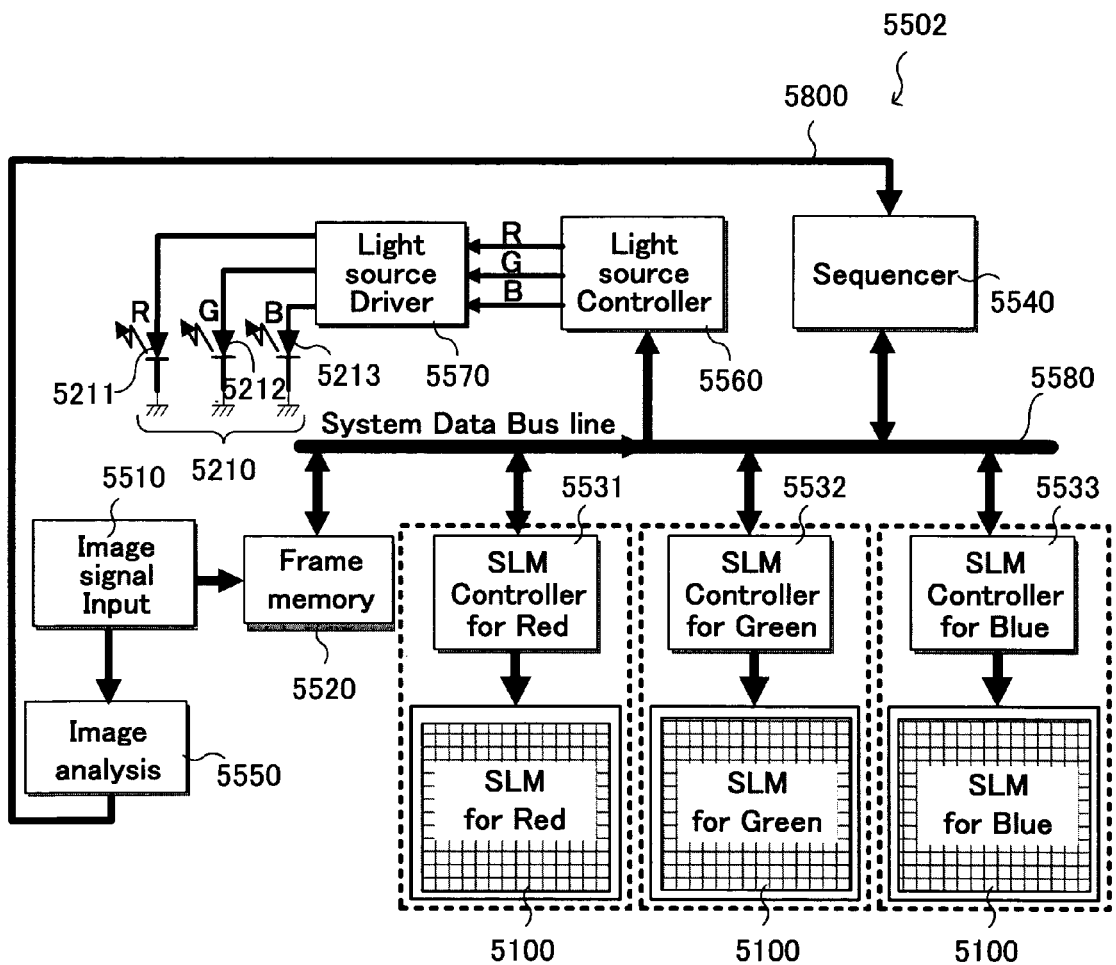
FIG. 3A is a functional block diagram showing a configuration example of the control unit comprised in a three-panel projection apparatus according to an embodiment of the present invention.

FIG. 3A is a functional block diagram showing a configuration example of the control unit comprised in the three-panel projection apparatus according to the present embodiment. The control unit 5502 comprises a frame memory 5520, three SLM controllers 5531, 5532, 5533, a sequencer 5540, a light source control unit 5560 and a light source drive circuit 5570. The sequencer 5540, constituted by a microprocessor, controls the operation timing of the entire control unit 5502 and the three spatial light modulators 5100. The frame memory 5520 stores the amount of one frame of input digital video data 5700 received from an external device (not shown in drawing), which is connected to a video signal input unit 5510. The input digital video data 5700 is updated every time the display of one frame is completed continuously.

The three SLM controllers 5531, 5532, 5533 are disposed to control each of the plurality of spatial light modulators 5100 provided for the respective colors of R, G and B, and process the input digital video data 5700 read from the frame memory 5520 as described later. Read data is separated into a plurality of sub-fields 5701 through 5703, and outputted to the spatial light modulators 5100 as binary data 5704 and non-binary data 5705, which are used for implementing an the ON/OFF control and oscillation control (which are described later) of a mirror 5112 of the spatial light modulators 5100. The sequencer 5540 outputs a timing signal to the corresponding spatial light modulators 5100 synchronously with the generation of the binary data 5704 and non-binary data 5705 at each the SLM controllers. The video image analysis unit 5550 outputs a video image analysis signal 5800 used for generating various light source patterns (which are described later) on the basis of the input digital video data 5700 inputted from the video signal input unit 5510.

The light source control unit 5560 implements a light source drive circuit 5570 controls the operation of the adjustable light source 5210 for using a light source profile control signal to emit the illumination light 5600. The light source profile control signal is generated on the basis of the video image analysis signal 5800 obtained from the video image analysis unit 5550 by way of the sequencer 5540 and which generates light source pulse patterns 5801 through 5811 (which are described later). For example, the video image analysis unit 5550 calculates the average picture level of a video signal input to the video signal input unit 5510, and outputs the video image analysis signal 5800 in accordance with the calculated average picture level.

The light source drive circuit 5570 drives the red 5211, green 5212 and blue 5213 laser light sources of the adjustable light source 5210 to emit light so as to generate a light source pulse pattern described later (such as a light source pulse pattern 5812), which are inputted from the light source control unit 5560.

Specifically, each of the SLM controller 5531, SLM controller 5532 and SLM controller 5533, is implemented to process the modulation of a specific color, Red, Green, and Blue. Each modulator is supported on the same substrate as those of the other spatial light modulators 5100. This configuration places the individual spatial light modulators 5100 and the corresponding SLM controller 5531, SLM controller 5532 and SLM controller 5533 close to each other, thereby enabling a high-speed data transfer rate.

Furthermore, a system bus 5580 is used to connect the frame memory 5520, light source control unit 5560, sequencer 5540 and SLM controllers 5531 through 5533, in order to speed up and simplify the connection path of each connecting element.

Figure 3B:
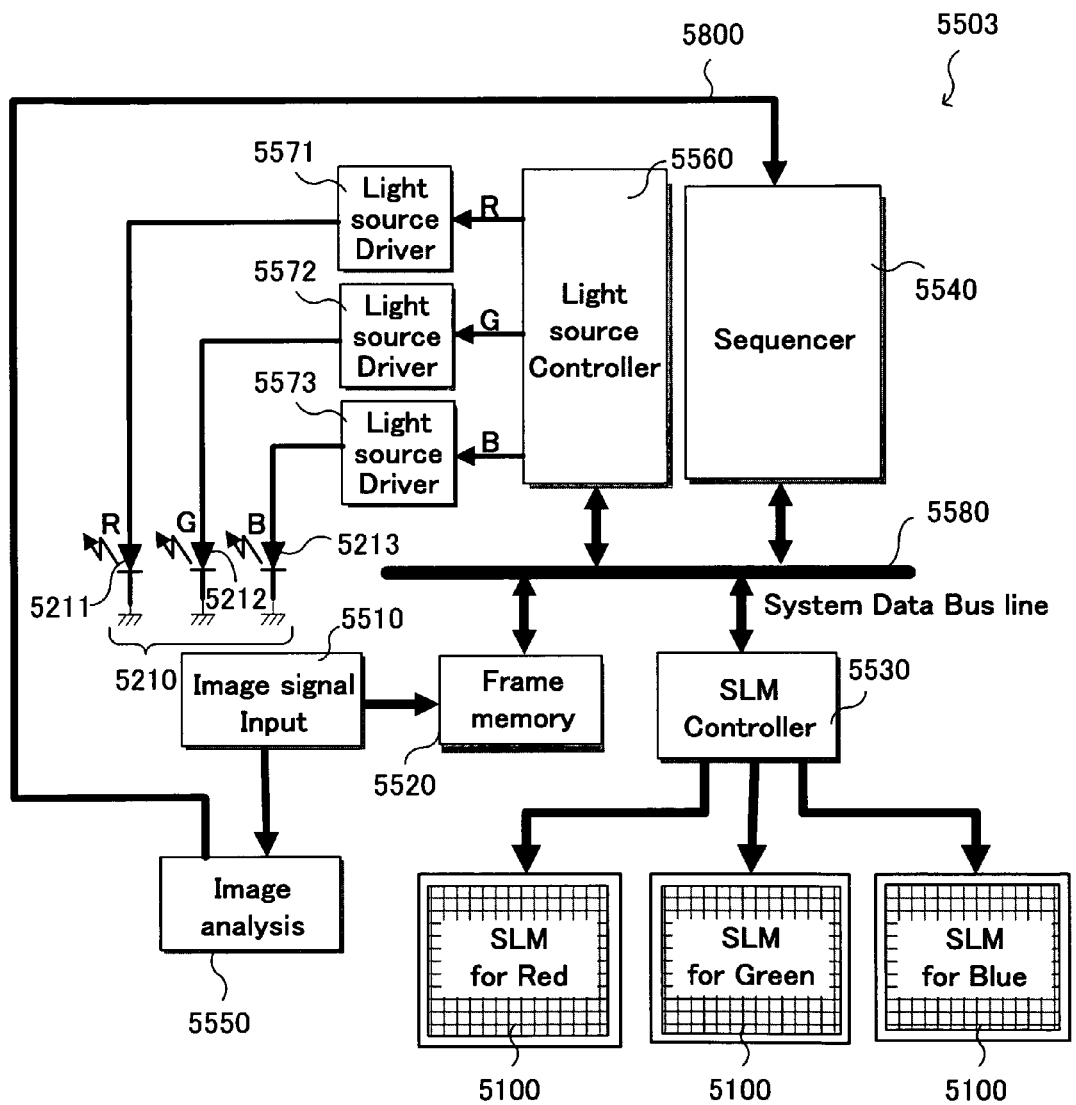
FIG. 3B is a functional block diagram showing a modified example of the configuration of the control unit for use in a three-panel projection apparatus according to an embodiment of the present invention.

FIG. 3B is a functional block diagram showing the configuration of a modification of the control unit comprised in the three-panel projection apparatus according to the present embodiment.

The control unit 5503 differs from the above described control unit 5502 in that the control unit 5503 is implemented with light source drive circuits 5571, 5572 and 5573, which are individually disposed and specifically used for the three laser light sources, i.e., a red 5211, green 5212 and blue 5213 laser light source. The control unit 5503 controls each of the plurality of spatial light modulators 5100 with a common SLM controller 5530, implemented for each of the three colors, i.e., R, G and B colors.

This configuration implements a single chip SLM controller 5530 to control the plurality of spatial light modulators 5100 thus further miniaturizing the apparatus.

Figure 4A:
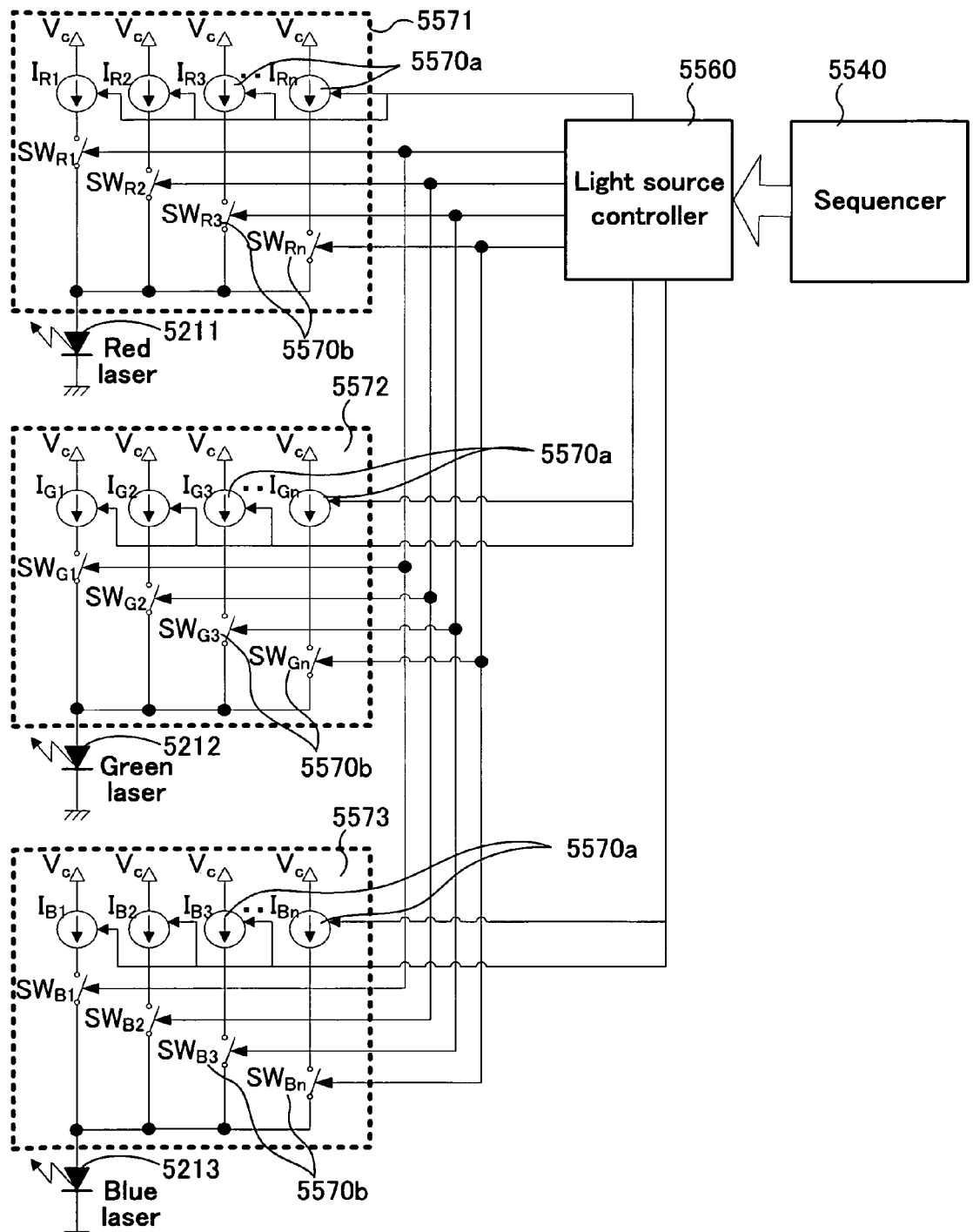
FIG. 4A is a circuit block diagram for showing a configuration example of the light source drive circuit of a three-panel projection apparatus according to an embodiment of the present invention.
Figure 4B:
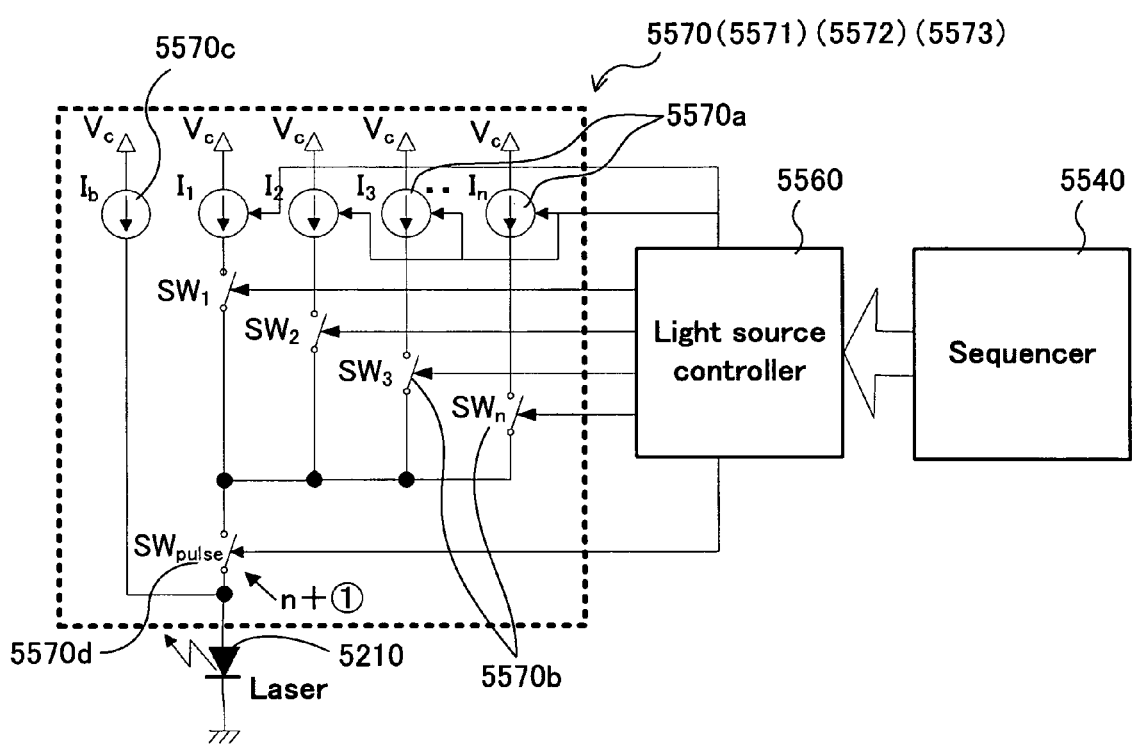
FIG. 4B is a circuit block diagram for showing a modified example of the configuration of the light source drive circuit of a three-panel projection apparatus according to an embodiment of the present invention.

Meanwhile, when configuring the control unit in accordance with the configuration example shown in FIG. 3B, the light source drive circuit 5570 (i.e., the light source drive circuits 5571, 5572 and 5573) may be implemented by using the configuration shown in FIG. 4A or FIG. 4B.

FIG. 4A is a block diagram showing a configuration of the light source drive circuit 5570 (i.e., the light source drive circuits 5571, 5572 and 5573) according to the present embodiment.

The light source drive circuit as shown in FIG. 4A includes a plurality of constant current circuits 5570a (i.e., I (R, G, B)$_1$ through I (R, G, B)$_n$) and a plurality of switching circuits 5570b (i.e., switching circuits SW (R, G, B)$_1$ through SW (R, G, B)$_n$), corresponding to the respective constant current circuits 5570a, in order to generate the desired light intensities. The light emissions are shown as P$_1$ through P$_n$ for the light source optical system 5200 (i.e., the red 5211, green 5212 and blue 5213 laser light sources).

The switching circuit 5570b carries out a switching in accordance with a desired emission profile of the adjustable light source 5210 (i.e., the red 5211, green 5212 and blue 5213 laser light source).

The setup values of the output current of the constant current circuits 5570a (i.e., constant current circuits I (R, Q B)$_n$), when the gray scale of the emission intensity of the adjustable light source 5210 is designated at N bits (where N≧n), are as follows:

$$I(R, G, B)_1 = I_{th} + LSB$$
$$I(R, G, B)_2 = LSB + 1$$
$$I(R, G, B)_3 = LSB + 2$$
$$\vdots$$
$$I(R, G, B)_n = MSB$$

Meanwhile, I$_{th}$ is the threshold current of the respective light sources (i.e., the red laser light source 5211, green laser light source 5212 and blue laser light source 5213), or a current value close to the threshold current. The value LSB represents the current amount to be provided to the respective light sources (i.e., the red laser light source 5211, green laser light source 5212 and blue laser light source 5213) in order to obtain the emission intensity corresponding to the least significant bit, and the value LSB+n represents the current amount to be provided to the respective light sources for the respective display-gray scale change.

In this exemplary embodiment, a gray scale display is controlled on the basis of the emission intensity. A similar gray scale display is achievable even if the emission period (i.e., an emission pulse width) and the emission interval (i.e., an emission cycle) are variable.

The relationship between the emission intensity of the adjustable light source and drive current for each color in this case is as follows. Note that "k" is an emission efficiency corresponding to the drive current:

$$P_1 = k * (I_{th} + I_1)$$
$$P_2 = k * (I_{th} + I_1 + I_2)$$
$$\vdots$$
$$P_n = k * (I_{th} + I_1 + I_2 + \ldots + I_{n-1} + I_n)$$

FIG. 4B is a block diagram showing a configuration example of a modified example of the light source drive circuit according to the present embodiment.

For simplicity, FIG. 4B denotes the constant current circuits 5570a (I (R, G, B)$_1$ through I (R, G, B)$_n$) as I$_1$ through I$_n$ and the switching circuits 5570b (SW (R, G, B)$_1$ through SW (R, G, B)$_n$) as switching circuits 5570b (SW$_1$ through SW$_n$).

As described later, the light source drive circuits 5570 according to the present embodiment is configured to control the individual constant current circuit 5570a (i.e., I (R, G, B)$_1$ in this case) to supply a current equivalent to the threshold current I$_{th}$ of the light source optical system 5200. Alternately, the individual constant current circuit supplies a current close to the aforementioned threshold current, as a bias current I$_b$ when a semiconductor laser or a similar light source is used as the light source optical system 5200. By using a high-speed current drive, the respective switching operation of the light source drive circuits 5570 is stabilized to provide a high-speed emission.

The light source drive circuits 5570 (i.e., the light source drive circuits 5571, 5572, and 5573) as shown in FIG. 4B comprises bias current circuits 5570c, which are continuously connected to the light source optical systems 5200 (i.e., the red 5211, green 5212 and blue 5213 laser light source) and which are used for applying a bias current I$_b$, in addition to the constant current circuits 5570a.

Further, the connection of the constant current circuits 5570a to the light source optical systems 5200 is configured through a switching circuit 5570d (SW$_{pulse}$) included on the downstream side of the switching circuits 5570b.

In the case of the configuration shown in FIG. 4B, the relationship between the emission intensity P$_n$ and drive current of the adjustable light source for each wavelength is the same as in FIG. 4A described above. The relationship between each switching operation and emission output is as follows:

$$SW_{pulse} = \text{OFF}: P_b = k * I_b \approx 0 [mW] (\text{where } I_b \approx I_{th})$$
$$SW_1 : P_1 = k * (I_b + I_1)$$
$$SW_2 : P_2 = k * (I_b + I_1 + I_2)$$
$$\vdots$$
$$SW_n : P_n = k * (I_b + I_1 + I_2 + \ldots I_{n-1} + I_n)$$

Figure 22:
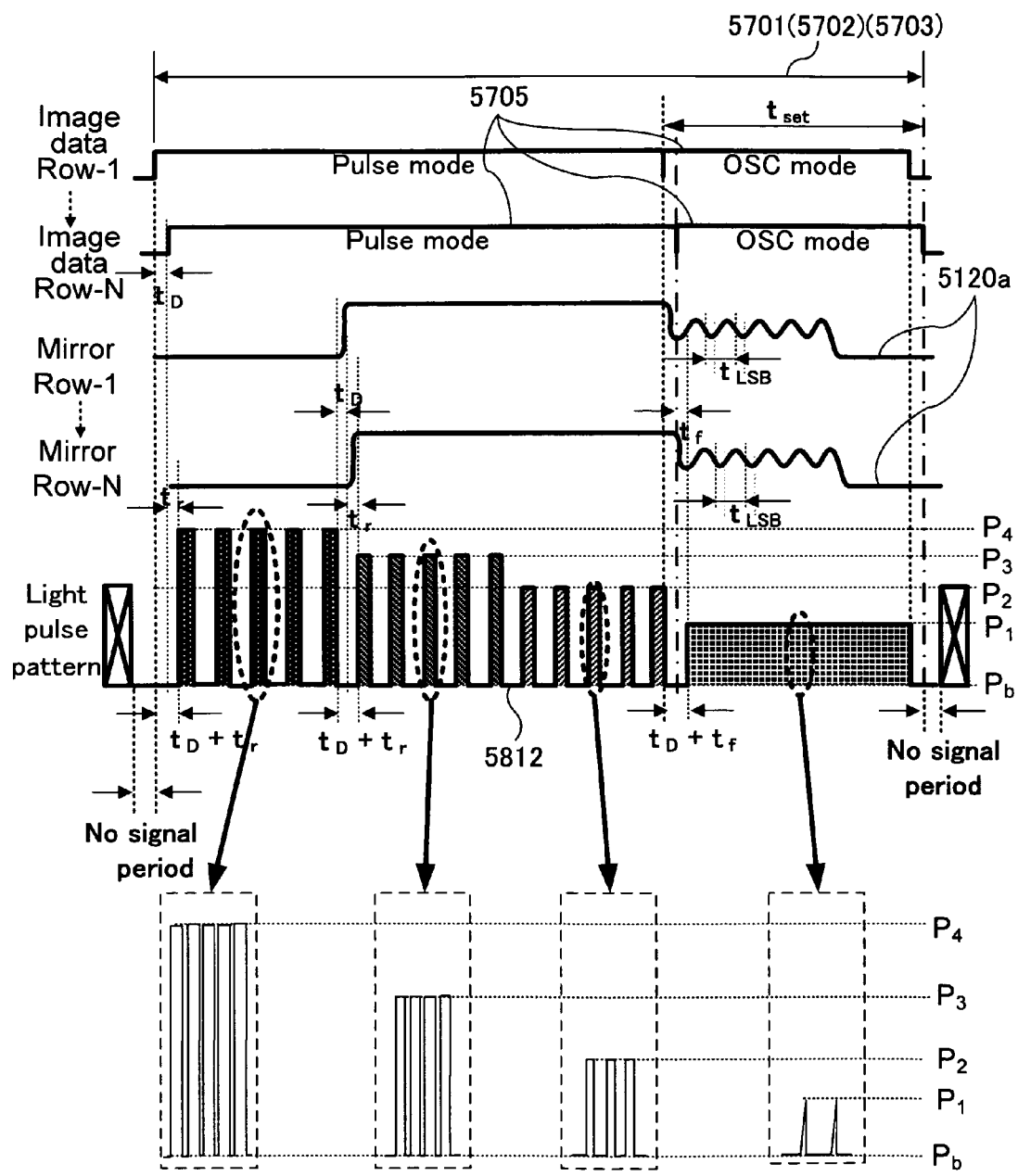
FIG. 22 is a chart illustrating the control scheme of a spatial light modulator using non-binary data performed in an embodiment of the present invention.

This configuration is able to control an emission profile with a nearly zero emission light intensity P$_b$ as shown in FIG. 22 (which is described below).

The use of the switching circuits 5570d as shown in FIG. 4B makes it possible to implement a circuit operation unaffected by a drive current switching over caused by the switching circuits 5570b (SW$_1$ through SW$_n$). Each of the switching circuits 5570b is connected to the respective constant current circuits 5570a. Particularly, a further function is carried out in that when the adjustable light source (i.e., the adjustable light source 5210) is not emitting light, the switching circuits (SW$_1$ through SW$_n$) are switched overadjustable light source.

While the bias current value is designated at a fixed current value in the configuration of FIG. 4B, it is also possible to connect the bias current circuit 5570c to the light source control unit 5560 and allow a variable bias current.

Figure 5:
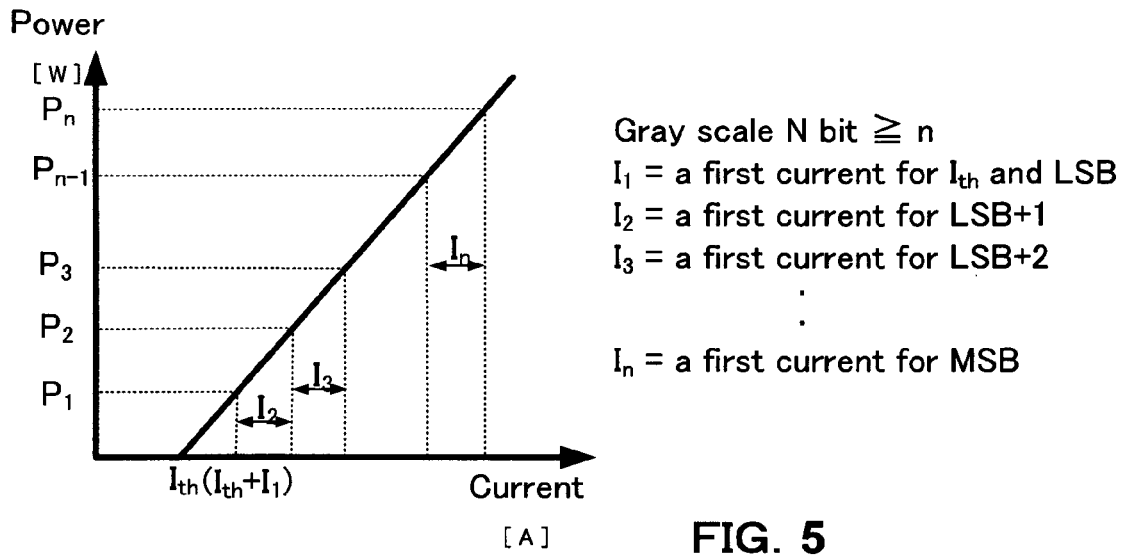
FIG. 5 is a diagram showing the relationship between the applied current of the light source drive circuit and the intensity of emission according to an embodiment of the present invention.

FIG. 5 is a diagram showing the relationship between the applied current I of the constant current circuit 5570a of the light source drive circuit and the emission intensity P$_n$ shown in the above described FIG. 4A.

Figure 6:
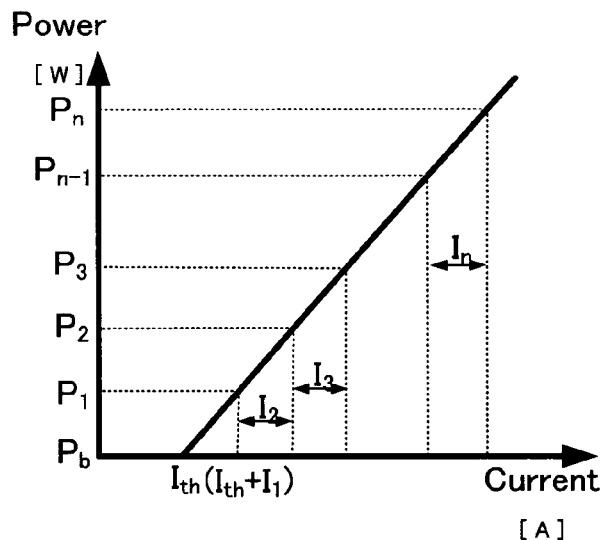
FIG. 6 is a diagram showing the relationship between the applied current of the constant current circuit of the light source drive circuit and the intensity of emission according to an embodiment of the present invention.

FIG. 6 is a diagram showing the relationship between the applied current I of the constant current circuit 5570a of the light source drive circuit and emission intensity P$_b$, emission intensity P$_n$ shown in the above described FIG. 4B.

Note that the descriptions for FIGS. 4A and 4B have been provided for the case of changing the emission profiles of the adjustable light source for each sub-frame corresponding to each gray scale bit. If the display gray scale function of the spatial light modulator 5100 is used in parallel, the number of required levels of electrical current decreases, thus reducing the number of constant current circuits 5570a and also the number of the switching circuits 5570b. It is therefore possible to obtain the number of gray scales equal to, or higher than, the gray scales achievable through the modulation process of the spatial light modulator 5100.

Figure 7:
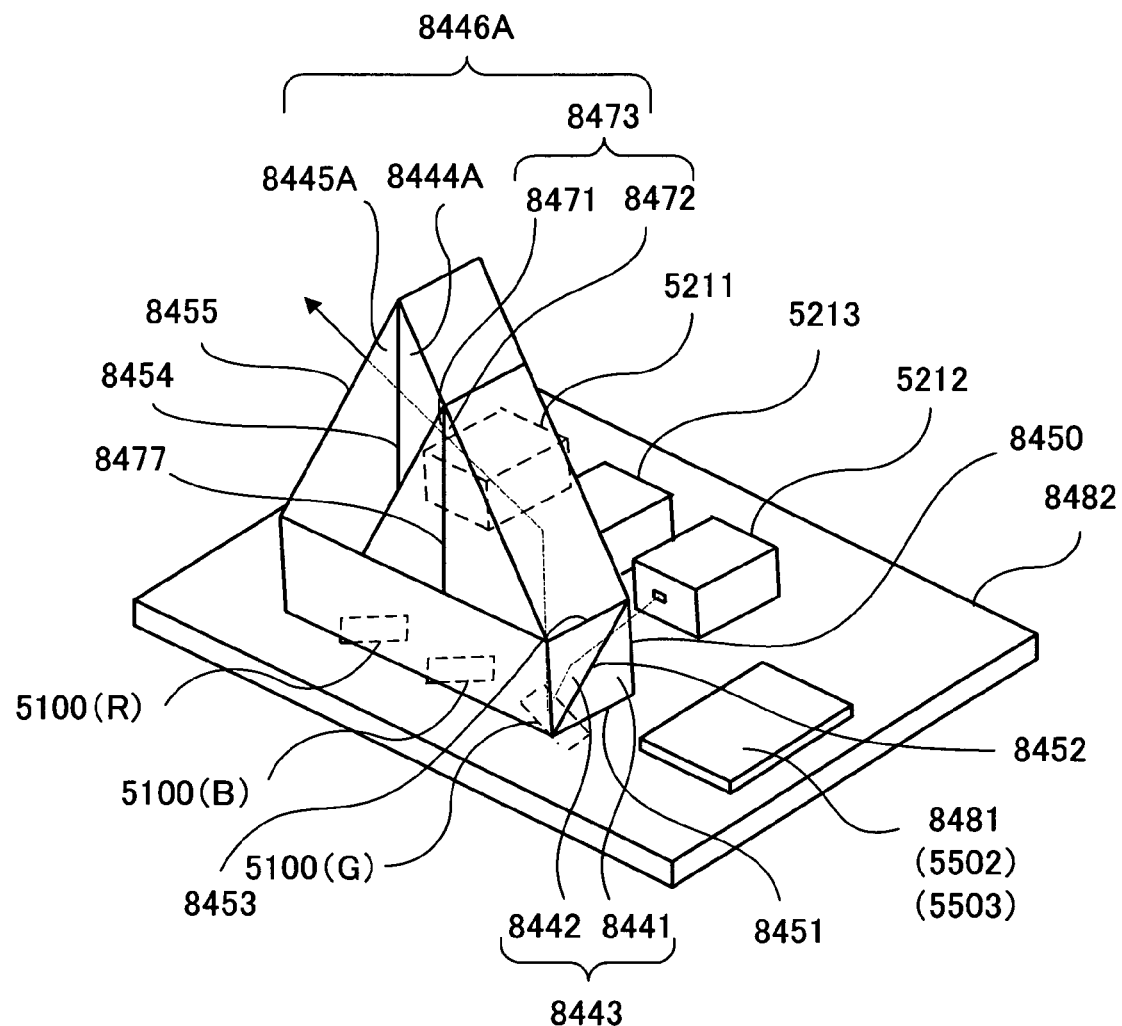
FIG. 7 is a perspective diagram for showing an example of forming constituent components on the same substrate of a three-panel projection apparatus according to an embodiment of the present invention.

In addition, when configuring the projection apparatus according to the present embodiment as a three-panel projection apparatus, it may be implemented by using, in addition to the configuration examples shown in FIG. 2A and FIG. 2B, the configuration example shown in, for example, FIG. 7.

FIG. 7 is a diagram showing another configuration example of the three-panel projection apparatus according to the present embodiment, mainly focusing on the configuration of the optical system.

The projection apparatus in the configuration example shown in FIG. 7 is configured to use the red 5211, green 5212 and blue 5231 laser light source, as the light sources of the respective colors, and place these light sources, the optical system made by joining the first joinder prism 8443 and second joinder prism 8446A together, three spatial light modulators 5100, and a controller 8481 used for controlling the aforementioned components, on the same board 8482. Such a configuration makes it possible to make the projection apparatus more compact.

In the configuration example shown in FIG. 7, the first joinder prism 8443 is a prism structured by joining two right-angle triangle columnar prisms 8441 and 8442 of approximately the same form. A second joinder prism 8446A is a prism configured to replace a part of a joinder prism that is structured by joining together two right-angle triangle columnar prisms 8444A and 8445A of the same form with a fourth joinder prism 8473 that is structured by joining together two right-angle triangle columnar prisms 8471 and 8472 of the same form.

In the projection apparatus in the configuration example shown in FIG. 7, The green light reflected by the joinder surface 8456 is reflected by the slope surface of the prism 8447 and is vertically projected to the first optical surface 8450 of the first joinder prism 8443, is reflected by the selective reflection surface 8452, is ejected from the second optical surface and is incident to one spatial light modulator 5100. Then, the incident light is reflected vertically upward when the mirror 4003 is in the ON state, and projected vertically to the second optical surface 8451 and transmitted through the selective reflection surface 8452 to transmit to the third optical surface 8453 of the second joinder prism 8446. Specifically, the green light is reflected by the slope surface of the prism 8444A, transmitted through the synthesis surface 8454, and synthesized with the red light (which is described later). The synthesized light is ejected from the ejection surface 8455 for projecting to a projection optical system (not specifically shown here).

The first optical surface 8450 is a surface opposite to each light source, and is configured to be vertical to a synthesis surface 8454 of the second joinder prism 8446A and a synthesis surface 8477 of the fourth joinder prism. The selective reflection surface 8452 is a surface for reflecting the light from the first optical surface 8450 and transmitting a modulation light. The second optical surface 8451 is an optical surface that ejects the light from the first optical surface 8450 and to which the modulation lights, modulated by three spatial light modulators 5100 equipped immediately under the first joinder prism 8443, are incident. The optical surface 8453 is a joinder surface with, or opposite surface to, the first joinder prism 8443, to which the modulation light ejected from the first joinder prism 8443 is incident. The synthesis surface 8477 is a joinder surface between the prisms 8471 and 8472 and is used for synthesizing, on the same light path, the lights modulated by two spatial light modulators 5100 (G) and 5100 (B). The synthesis surface 8454 is a joinder surface between the prisms 8444 and 8445, and used for synthesizing, on the same light path, a plurality of incident lights. On the synthesis surface 8454, a dichroic filter is used for reflecting the lights of the red and blue frequency components and transmitting the light of the green frequency component. The optical surface 8455 is an ejection surface that is equipped at a position approximately opposite to a projection lens (i.e., a projection optical system 5400 (not shown in drawing) and that ejects the synthesized light.

Meanwhile, the red or blue light from the red 5211 or blue 5213 laser light source is incident vertically to the first optical surface 8450 of the first joinder prism 8443, is reflected by the selective reflection surface 8452, is ejected from the second optical surface 8451 and enters the spatial light modulators 5100 (R) or 5100 (B). Then, when the mirror is in the ON state, the incident light is reflected vertically upward, is incident vertically to the second optical surface 8451, transmits through the selective reflection surface 8452 and enters the third optical surface 8453 of the second joinder prism 8446.

The blue light then projects onto the third optical surface 8453 and is reflected by the slope surface of the prism 8471, and further reflected by the synthesis surface 8477 and synthesized with the above-described green light. The synthesized light is ejected from the slope surface of the prism 8471 and enters the prism 8444A. After the synthesized light enters into the prism 8444A, the green and blue synthesized light transmits through the synthesis surface 8454, and is then synthesized with the red light (which is described later) so that the synthesized light is ejected from the ejection surface 8455 and enters a projection optical system (not shown in drawing).

Meanwhile, having entered the third optical surface 8453, the red light is reflected by the slope surface of the prism 8445A, is further reflected by the synthesis surface 8454 and is then synthesized with the above described blue/green synthesized light so that the synthesized light is ejected from the ejection surface 8455 and enters a projection optical system (not shown in drawing).

Figure 8A:
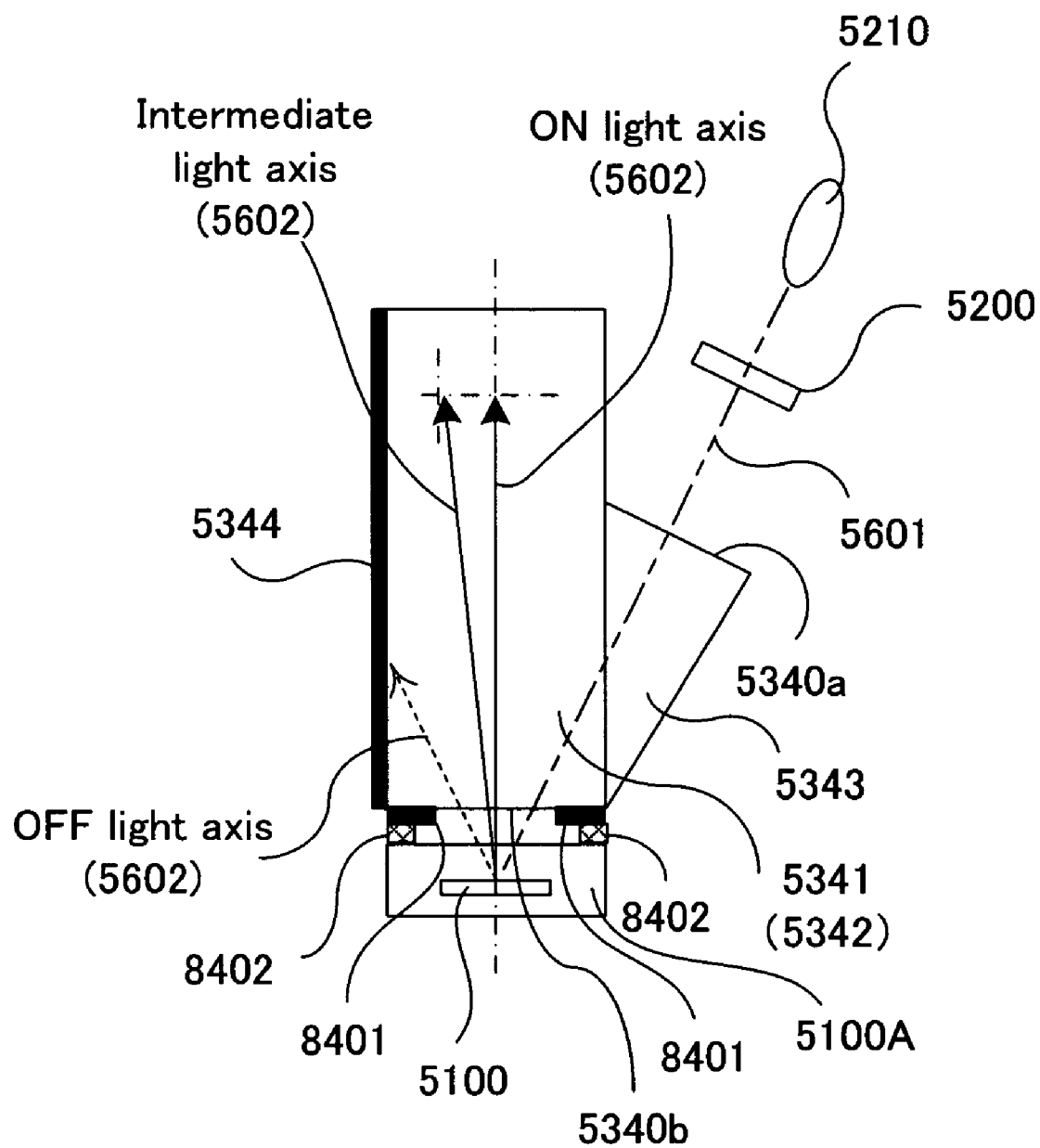
FIG. 8A is a side view diagram of a two-panel projection apparatus according to an embodiment of the present invention.
Figure 8B:
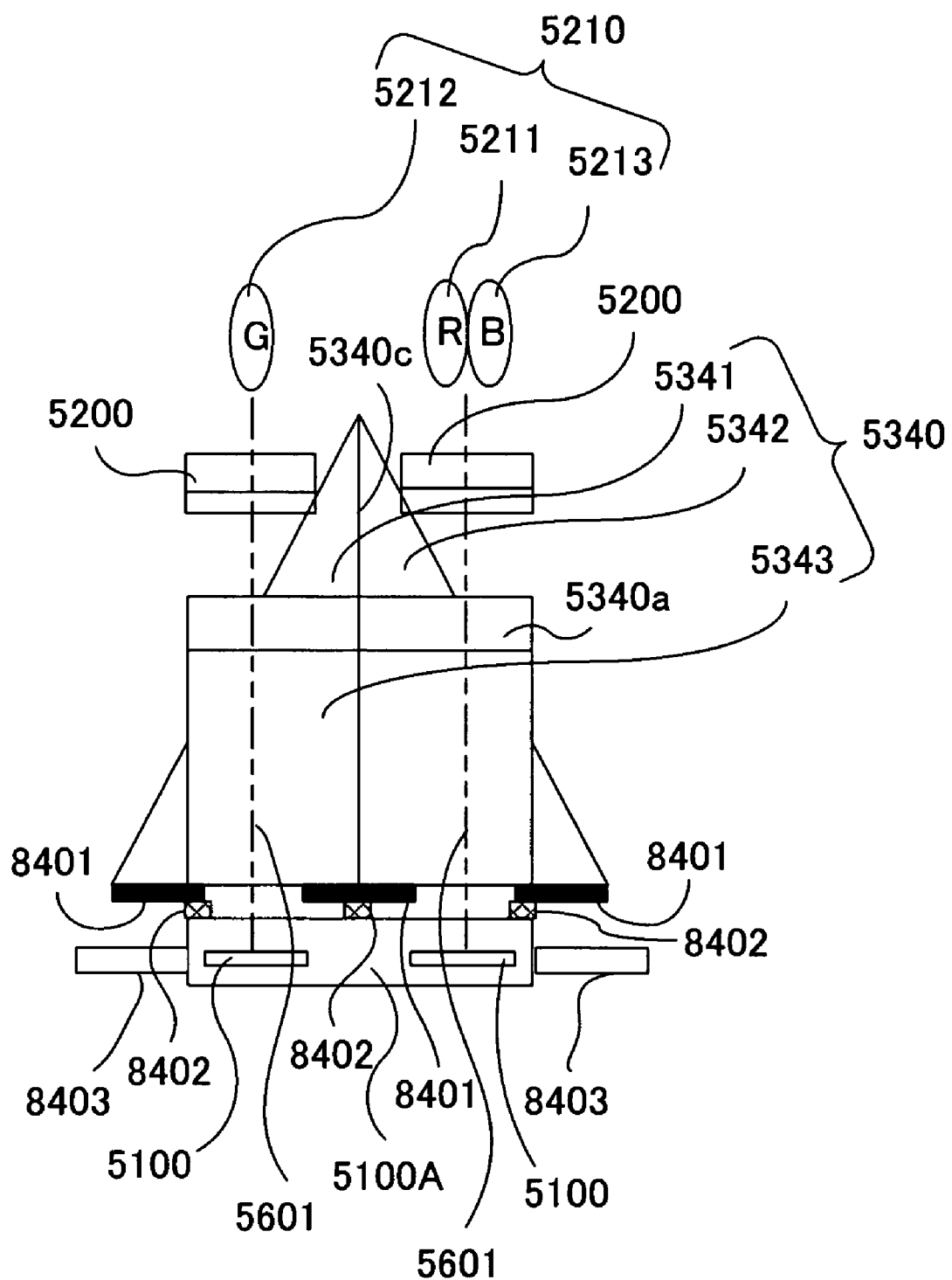
FIG. 8B is a front view diagram of a two-panel projection apparatus according to an embodiment of the present invention.
Figure 8C:
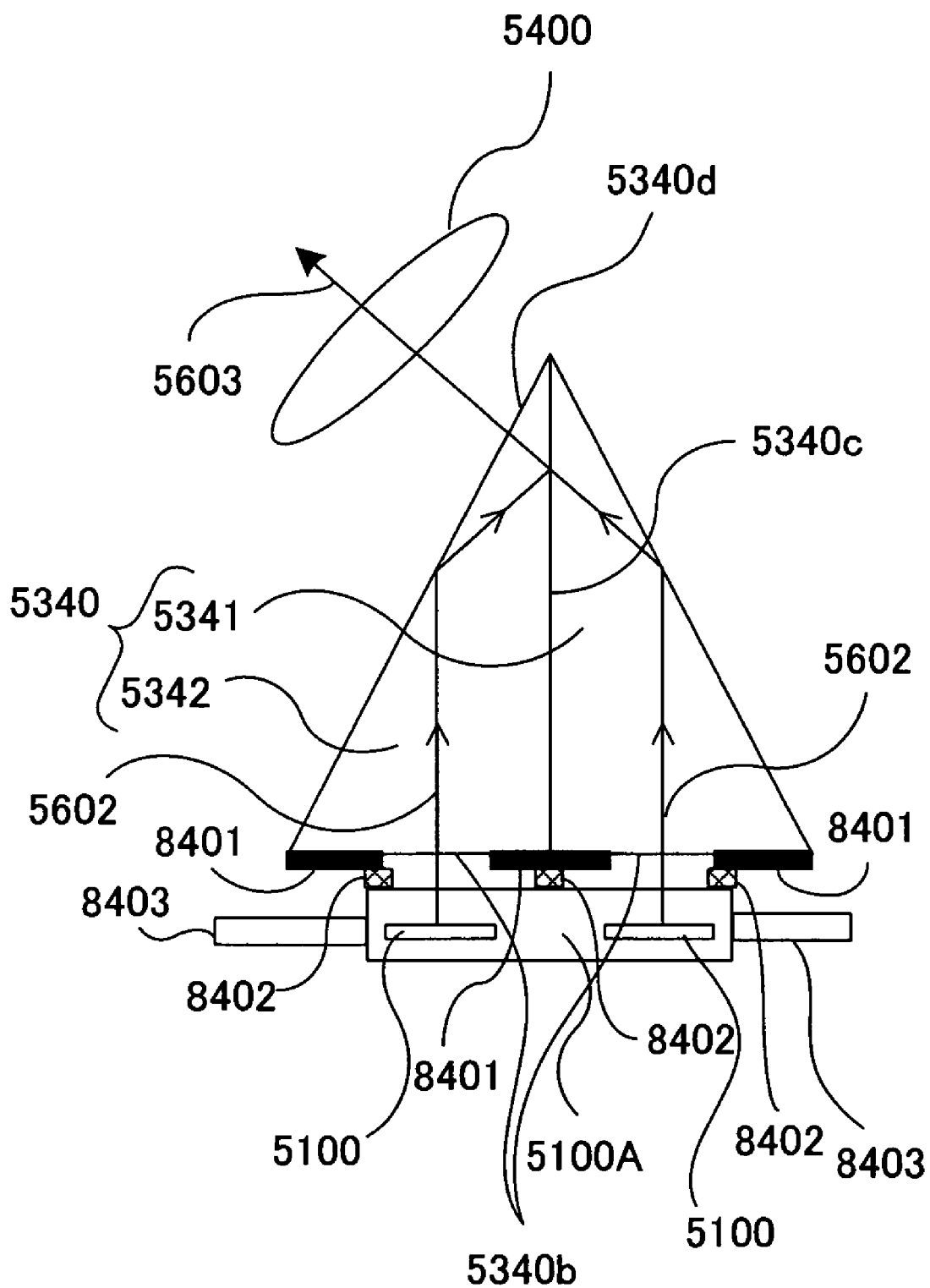
FIG. 8C is a rear view diagram of a two-panel projection apparatus according to an embodiment of the present invention.
Figure 8D:
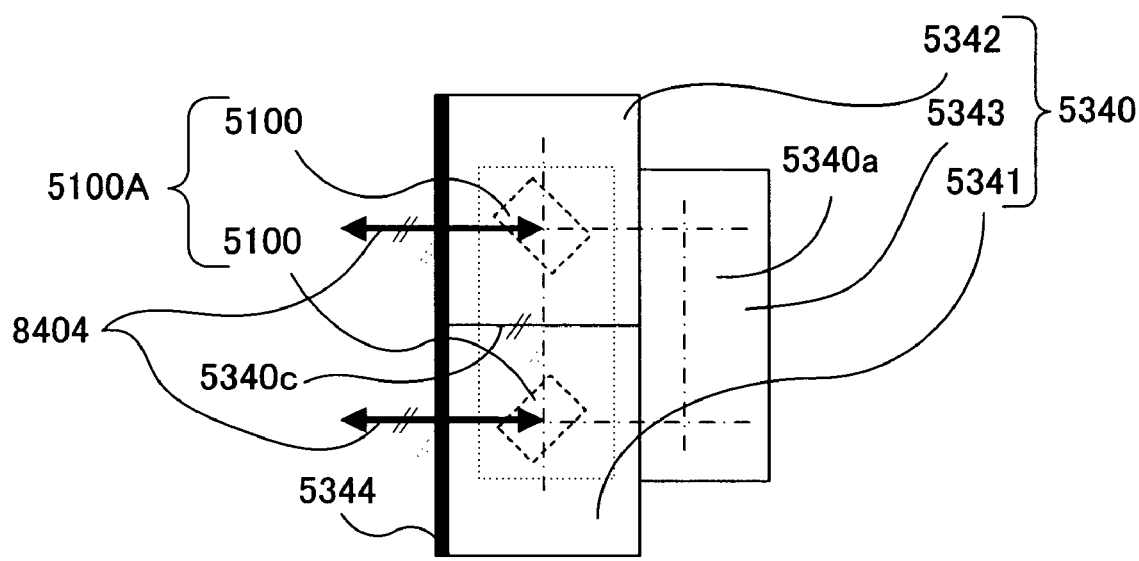
FIG. 8D is a top view diagram of a two-panel projection apparatus according to an embodiment of the present invention.

FIGS. 8A, 8B, 8C and 8D are diagrams showing an exemplary configuration of the two-panel projection apparatus according to the present embodiment, mainly focusing on the configuration of the optical system. FIG. 8A is a side view diagram; FIG. 8B is a front view diagram; FIG. 8C is a rear view diagram; and FIG. 8D is a top view diagram.

The optical system according to the present embodiment comprises a device package 5100A integrally packaging two spatial light modulators 5100, a color synthesis optical system 5340, a light source optical system 5200, and a adjustable light source 5210.

The plurality of spatial light modulators 5100 incorporated in the device package 5100A are fixed in a position in which the rectangular contour of the spatial light modulator 5100 is inclined at approximately 45 degrees, on a horizontal plane, relative to each side of the device package 5100A having a similar rectangular shape.

The color synthesis optical system 5340 is placed on the device package 5100A. The color synthesis optical system 5340 comprises right-angle triangle pole-shaped prisms 5341 and 5342, which are joined together so as to form an equilateral triangle column on the longitudinal side. On one of the side faces of the prisms 5341 and 5342, a right-angle triangle column-shaped light guide block 5343 is adhesively attached, with the bottom surface of the light guide block 5343 facing up.

On the other side face of the prisms 5341 and 5342, a light absorption body 5344 is equipped. The bottom of the light guide block 5343 is equipped with the light source optical system 5200 of the green laser light source 5212, and the light source optical system 5200 of the red 5211 and blue 5213 laser light source, with the optical axis of each of the light source optical systems 5200 maintained in a vertical position.

Furthermore, the illumination light 5600 emitted from the green laser light source 5212 is incident to the spatial light modulator 5100, on one side, which is positioned immediately under the prism 5341, as an incident light 5601, by way of the light guide block 5343 and the prism 5341. Also, the illumination lights 5600, emitted from the red 5211 and blue 5213 laser light source are incident to the spatial light modulator 5100, on the other side, which is positioned immediately under the prism 5342, as the incident light 5601, by way of the light guide block 5343 and the prism 5342. The red and blue incident lights 5601, incident to the spatial light modulator 5100, are reflected vertically upward, as reflection lights 5602, in the prism 5342 and are further reflected by the external surface and adhesively attached surface, in this order, of the prism 5342, then are incident to the projection optical system 5400 and projected as projection light 5603, in the ON state of a mirror 5112.

Meanwhile, the green incident light 5601 incident to the spatial light modulator 5100 is reflected to vertically upward direction as a reflection light 5602 in the prism 5341 and is further reflected by the external surface of the prism 5341, is directed through the same light path as the red and blue reflection lights 5602 and is incident to the projection optical system 5400, in which the incident light is projected as the projection light 5603, in the ON state of the mirror 5112.

As described above, the projection apparatus according to the present embodiment is configured to accommodate at least two modules of spatial light modulators 5100 in a single device package 5100A. One module is illuminated only with the incident light 5601 from the green laser light source 5212. The other module is illuminated with the incident light 5601 from either or both of the red laser light source 5211 or blue laser light source 5213. Individual modulation lights modulated by two spatial light modulators 5100 are synthesized at the color synthesis optical system 5340 as described above. The synthesized light is further expanded by the projection optical system 5400 and projected onto the screen 5900 as the projection light 5603.

In the projection apparatus according to the present embodiment, in the two spatial light modulators 5100, the directions of the optical axes of reflection light (i.e., an ON light axis, an OFF light axis and intermediate light axis) in an ON state, an OFF state and an intermediate state (the state between the ON state and the OFF state) of each mirror 5112 are the same as those shown in FIG. 8A. Note that the optical axis of the reflection light, when the mirror 5112 is in an intermediate state, may, of course, be between the ON light axis (5602) and OFF light axis (5602) instead of being in the intermediate axis 5602 specifically shown in FIG. 8A.

In addition, in the projection apparatus according to the present configuration, a light absorption body 8401 is equipped on a part of the bottom surfaces of both the right-angle triangle columnar prism 5341 and the prism 5342. A thermal conduction member 8402 used for radiating the heat is equipped between the light absorption body 8401 and a device package 5100A. Furthermore a circuit board 8403 disposed for controlling the two spatial light modulators 5100 is equipped on the device package 5100A.

According to the present configuration, the surface 5340a in the color synthesis optical system 5340 of the projection apparatus is the bottom surface of a light guide block 5343 formed in a triangular column, and the surface 5340b is the bottom surface of the right-angle triangle columnar prism 5341 and prism 5342. the surface 5340c is the joinder surface, joining the right-angle triangle columnar prism 5341 to the prism 5342, and the surface 5340d is the sloped surface of the right-angle triangle columnar prism 5342. Note that the joinder surface 5340c, being a synthesis surface, is configured to reflect the light of the frequency components of red and blue and transmit the light of the frequency component of green by means of a dichroic filter.

In addition, in the projection apparatus according to the present configuration, the optical axis locus of the reflection light, in accordance with the states of the mirror 5112 (i.e. the ON state, OFF state and intermediate state), and specifically the deflection locus of the modulation light modulated by the mirror 5112, is configured approximately parallel to the joinder synthesis surface 5340c, as indicated by the deflection locus 8404 shown in FIG. 8D.

Furthermore, a light absorption body 5344 configured as the light absorption member absorbs an extraneous modulation light as shown in FIG. 8A. Therefore, in the projection apparatus according to the present configuration, the extraneous modulation light is not contributing to the projection (e.g., the light of the OFF light axis 5602).

A projection apparatus according to the present configuration decreases the size of the optical prism (the color synthesis optical system 5340). In addition to miniaturizing the optical prism, taking advantage of using a laser light source as the light source, the configuration also makes the apparatus more compact.

Furthermore, the extraneous modulation light as represented by the reflection light when the mirror 5112 is in the OFF state is absorbed by the light absorption body 5344 and not contributing to the projection, therefore, a contrast of a projection image can be improved.

Furthermore, FIG. 7 shows that the green laser light source 5212, red laser light source 5211 and blue laser light source 5213, two spatial light modulators 5100 and a controller used for controlling the aforementioned components of may be placed on the same board to form the projection apparatus according to the present configuration.

Figure 9:
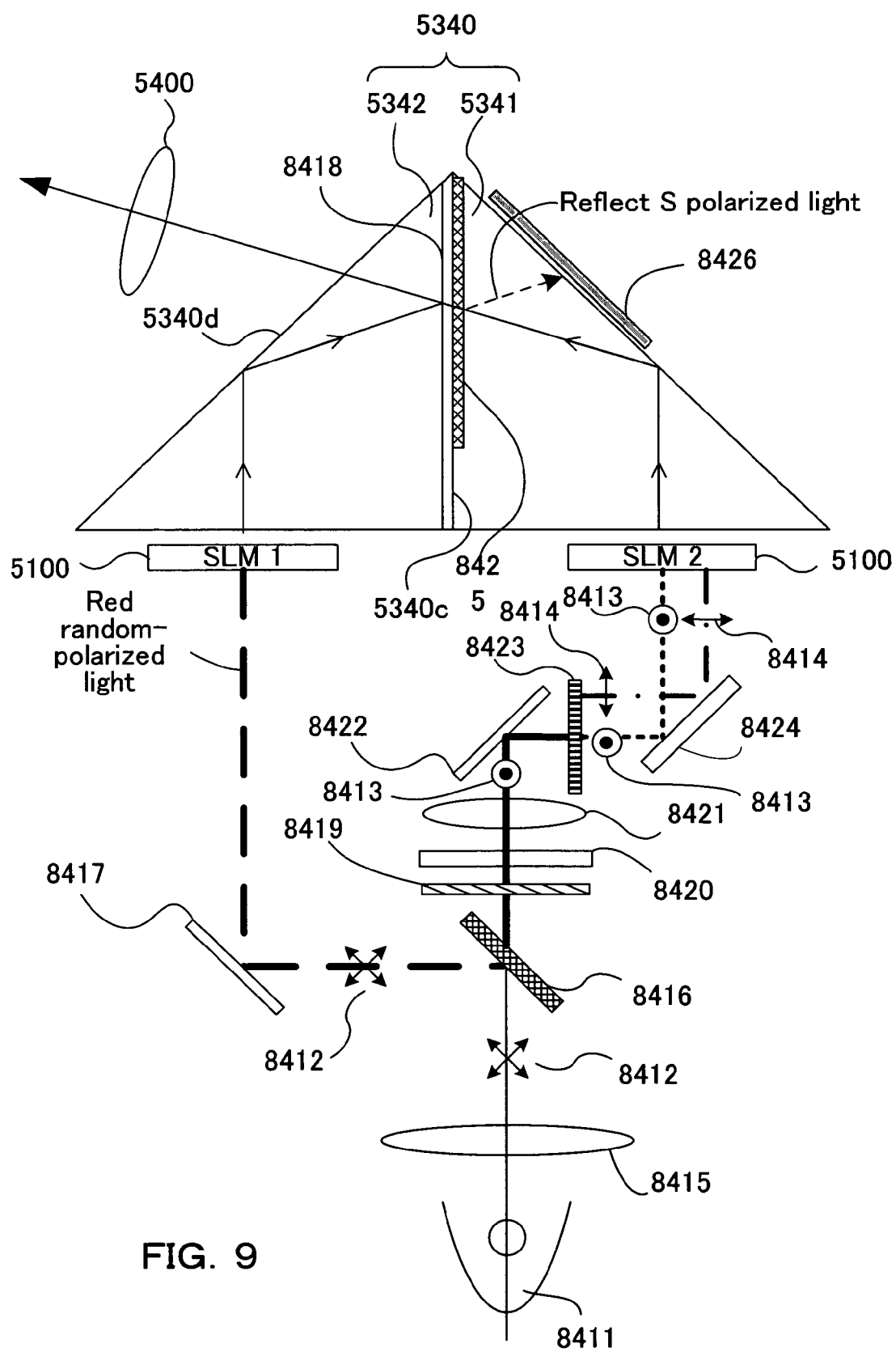
FIG. 9 is a diagram for illustrating the two-panel projection apparatus according to an embodiment of the present invention.

Furthermore, the projection apparatus according to the present configuration can also be implemented by a configuration example illustrated in FIG. 9, in addition to using the configuration example shown in FIGS. 8A through 8D.

FIG. 9 is a diagram showing another configuration example of the two-panel projection apparatus according to the present embodiment. In FIG. 9, the light source, the configuration between the light source and optical prism, and a part of the optical prism are what make the exemplary configuration illustrated in FIG. 9 different from the exemplary configuration shown in FIGS. 8A through 8D. Other than these differences, these two apparatuses have the same configuration.

FIG. 9 shows an image projection apparatus implemented with a light source 8411 emitting white light in a non-polarization state. The light source 8411 may be implemented with a mercury lamp, xenon lamp or a composite light source to project lights of multiple wavelengths or light projected from a fluorescent body with a single color light source such as light emitting diode (LED).

Furthermore, the light projected from the light source as that shown FIG. 9 may include a light in the non-polarization, P-polarization and S-polarization states by using the marks 8412, 8413 and 8414, respectively.

The light emitted from the light source 8411 passes through an illumination optical system 8415 and is then transmitted to a dichroic filter 8416. The red light (i.e., the light of red frequency component) as part of the lights projected to the dichroic filter 8416 is reflected by the dichroic filter 8416 while the green and blue lights (i.e., the lights of green and blue frequency components) transmit through the present dichroic filter 8416.

The red light reflected by the dichroic filter 8416 is then reflected by a retention mirror 8417 and projected to the first optical surface (not specifically shown) of the color synthesis prism 5340 and further projected from the second optical surface (not specifically shown) and is incident to the spatial light modulators (SLM 1) 5100. The optical path of the light after entering the spatial light modulator (SLM1) 5100 is basically the same as the optical path shown in the exemplary configuration shown in FIGS. 8A through 8D. Specifically, when the mirror 4003 is operated in an ON state, the light is reflected vertically upwards by the mirror 4003 and is re-incident to the second optical surface 5340b of the color synthesis prism 5340. Then, the red light projecting to the second optical surface is reflected by the slope surface (i.e., an ejection surface 5340d) of the right-angle triangle columnar prism 5342, is further reflected by the surface 5340c functioning as the synthesis surface. The light is synthesized with the light of P-polarization as described below. Then, the synthesized light is ejected from the ejection surface 5340d and is projected to a projection optical system 5400. A dichroic color filter 8418 is placed on the side of the joinder surface 5340c of the prism 5342 for reflecting the light of the red frequency component and transmits the lights of the green and blue frequency components.

Meanwhile, the green and blue lights transmitted through the dichroic filter 8416 are then polarized by a PS integrator 8419 as a linear polarized light, (i.e., a P-polarization state in the present embodiment) and transmitted through a micro lens 8420 and lens 8421 and reflected by a retention mirror 8422 for projecting to a polarization conversion member 8423.

The polarization conversion member 8423 selectively rotates the polarizing direction of the light of a specific frequency component. The polarization conversion member 8423 can be implemented by using a color switch, a Faraday rotator, a photo-elastic modulator, or a wave plate that is inserted into a light path.

The polarization conversion member 8423 of the present embodiment changes the lights transmitted in different frequencies by rotating the polarizing direction. The polarizing directions of the green or blue lights are rotated by 90 degrees. The lights are converted into an S-polarization state for transmitting as output lights from the polarization conversion member 823. Specifically, the green light in the P-polarization state and the blue light in the S-polarization state are output from the polarization conversion member 8423, or the green light in the S-polarization state and the blue light in the P-polarization state are output therefrom.

The output lights of P-polarized light and S-polarized light, from the polarization conversion member 8423, are then reflected by a retention mirror 8424 and incident to the first optical surface of the color synthesis prism 5340 and further ejected from the second optical surface and are incident to the spatial light modulator (SLM 2) 5100.

The optical paths of the lights after entering the spatial light modulator (SLM 2) 5100 are basically the same as the optical paths shown in the exemplary configuration as depicted in FIGS. 8A through 8D. The projection apparatus shown in FIG. 9, however, is implemented on the side joiner surface 5340c of the prism 5341 with a polarization light beam splitter (PBS) 8425, for transmitting a P-polarized light and reflecting an S-polarized light. The projection apparatus is further implemented with a light absorption member 8426 on the slope surface of the prism 5341 for absorbing the light reflected by the PBS 8425. Accordingly, the optical path, when the mirror is operated in an ON state, is described as follows. Specifically, the lights projected to the spatial light modulator (SLM 2) 5100 are reflected vertically along an upward direction by the mirror 5112. The reflected lights are further transmitted to the second optical surface of the color synthesis prism 5340b and reflected by the slope surface of the right-angle triangle columnar prism 5341. The lights are then projected to the PBS 8425. Then, the P-polarized light of the lights incident to the PBS 8425, transmits through the present PBS 8425, while the S-polarized light is reflected by the present PBS 8425 and absorbed by a light absorption member 8426.

The P-polarized light (i.e., green or blue light) transmitting through the PBS 8425, further transmits through the joinder surface 5340c to pass through a dichroic color filter 8418 and synthesized with the above-described red light. The synthesized light is ejected from the ejection surface 5340d of the prism 5342 and is incident to the projection optical system 5400

The two-panel projection apparatus according to the present embodiment can be further miniaturized by miniaturizing the optical prism by using a projection apparatus configured as shown in FIG. 9. Similar to the exemplary configurations shown in FIGS. 8A through 8D the contrast of a projection image is also improved.

One spatial light modulator (SLM 1) 5100 of the present embodiment modulates the red light constantly. Another spatial light modulator (SLM 2) 5100 modulates the green light and blue light alternately. It is well known that the red component is the least amount among the spectrum when a high-pressure mercury lamp is used as the light source. Therefore, the present embodiment is configured to constantly project the red light to compensate for a shortage of the red light in a light source. The light source with red light compensation can therefore effectively enhance the brightness of a projection image. For a light source implemented with a laser light, the laser light source is controlled to project a green light continuously due to the low emission of the green light in the laser light. As described above, it is also desirable to configure the projection apparatus for providing the best brightness and contrast of the image display by changing the allocations of the light source lights to the two spatial light modulators compatible with the characteristic of the light source.

Figure 10:
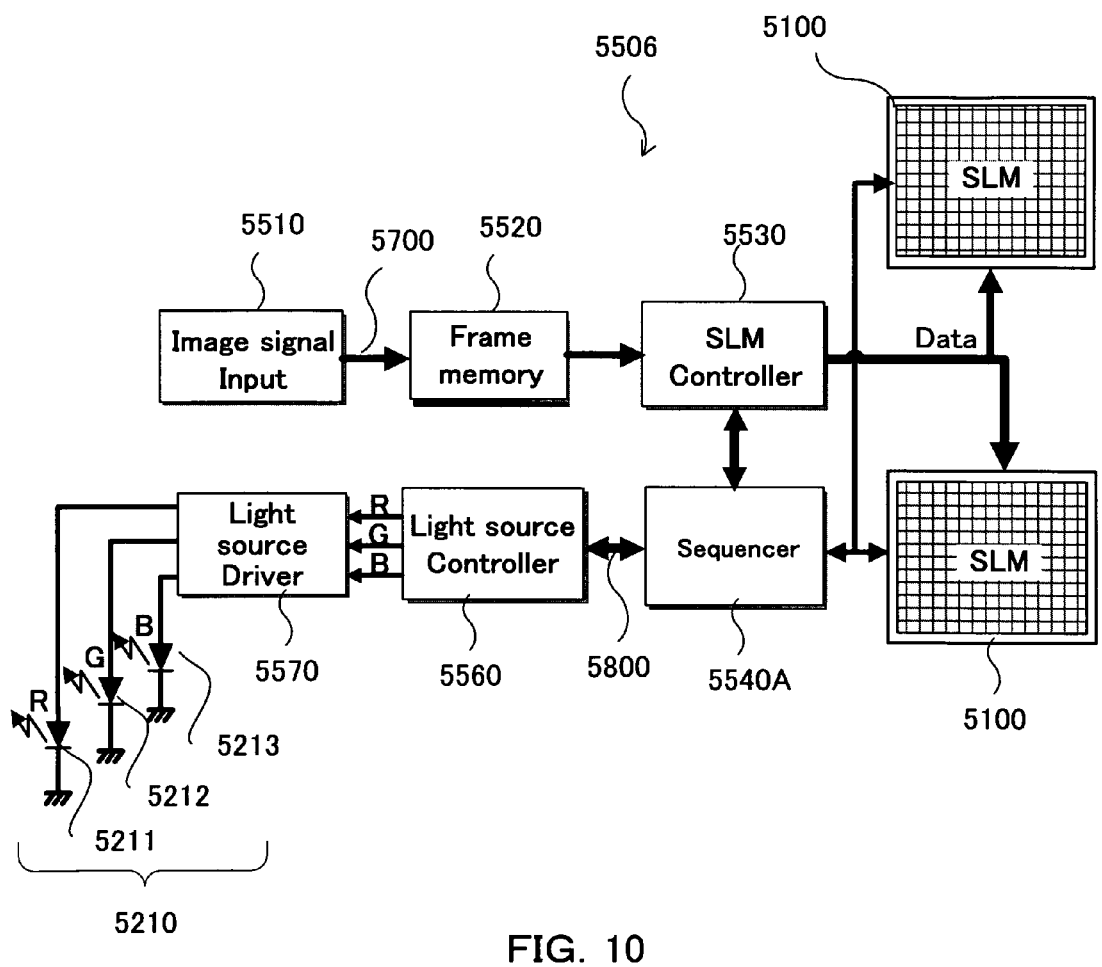
FIG. 10 is a functional block diagram for showing a control unit comprised in the two-panel projection apparatus according to an embodiment of the present invention.
Figure 11:
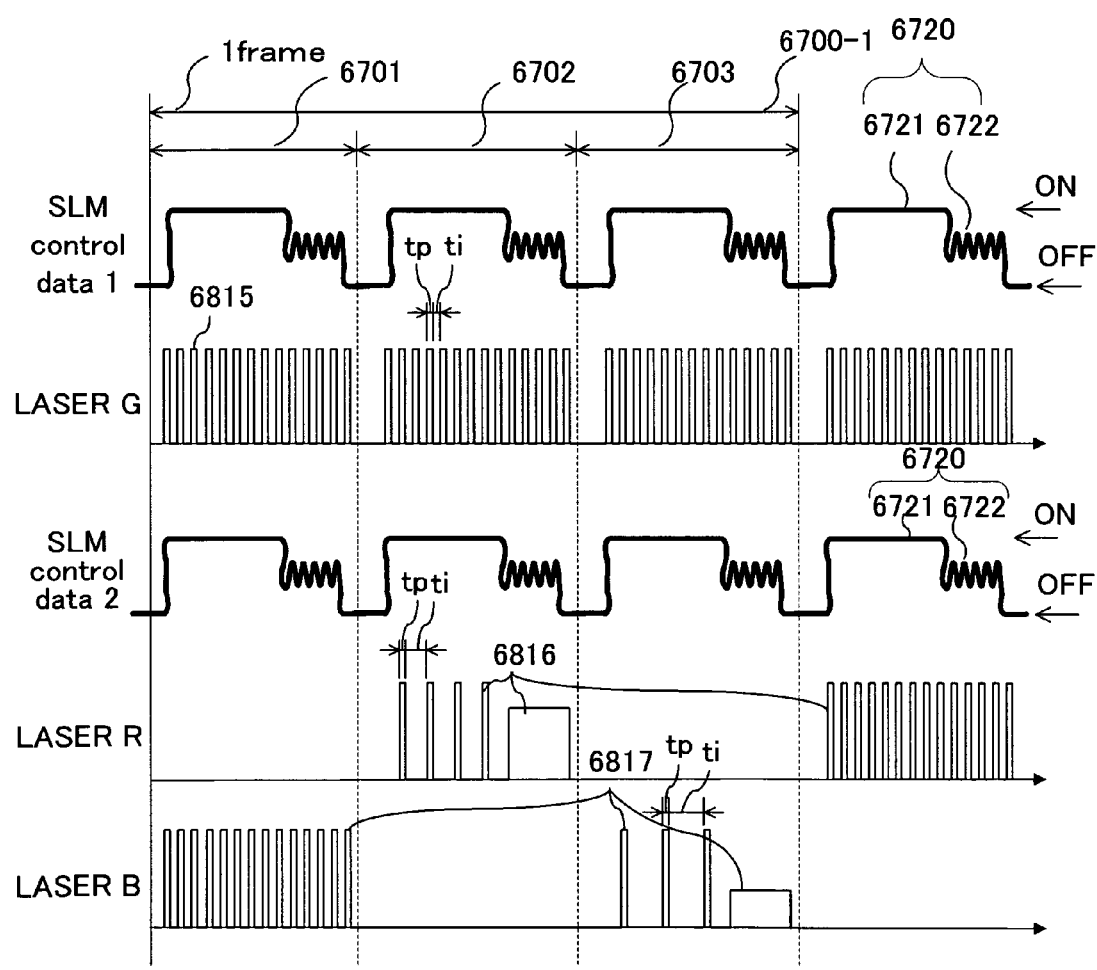
FIG. 11 is timing diagram for showing the waveform of a control signal of the two-panel projection apparatus according to an embodiment of the present invention.

FIG. 10 is a functional block diagram showing a configuration example of a control unit comprised in the two-panel projection apparatus according to the present embodiment. FIG. 11 is a timing diagram for showing the waveform of the control signal of the projection apparatus according to the present embodiment.

A drive signal (i.e., the mirror control profile 6720 shown in FIG. 11) generated by the SLM controller 5530 drives the two spatial light modulators 5100 packaged in the device package 5100A. The light source control unit 5560 generates a light source profile control signal 5800, corresponding to the mirror control profile 6720 as the signal for driving the respective spatial light modulators 5100 and inputs the generated profile 6720 to the light source drive circuit 5570, which in turn adjusts the intensity of the laser lights (i.e., the illumination lights 5600) emitted from the red 5211, green 5212 and blue 5213 laser light source.

The control unit 5506 of the projection apparatus according to the present embodiment is configured such that one SLM controller 5530 drives the two spatial light modulators 5100, and thereby the illumination lights 5600 are emitted to each spatial light modulator 5100 with the most optimal intensity without requiring the individual spatial light modulators 5100 to function with a light source control unit 5560 or light source drive circuit 5570. This configuration simplifies the circuit configuration of the control unit 5506.

As shown in FIG. 11, the light source control unit 5560 and light source drive circuit 5570 drive the red 5211, green 5212 and blue 5213 laser light source so as to adjust the emission intensities of the individual lasers (i.e., the illumination light 5600) of the respective colors R, G and B in sync with the respective SLM drive signal (i.e., the mirror control profile 6720) that are generated by the SLM controller 5530.

In this case, a color sequence control is employed for the two colors B and R sharing one spatial light modulator 5100. Specifically, one frame includes a plurality of subfields 6701, 6702 and 6703, and the same light source pulse pattern 6815 is repeated in the respective subfields for one spatial light modulator 5100 corresponding to green (G). Meanwhile, as for red (R) and blue (B), which share one spatial light modulator 5100, the pulse emissions of the red laser light source 5211 and blue laser light source 5213 are controlled operate according the lengths of time defined by the subfields, i.e., subfields 6701 through 6703, alternately in a time series, as indicated by the light source pulse patterns 6816 and 6817, respectively.

The present embodiment increases the gradation levels for light intensities for display images with the colors R, G and B.

The following is a description of a configuration example of the spatial light modulator 5100 comprised in the projection apparatus according to the present embodiment, in reference to FIGS. 12, 13, 14, 15, 16, 17, 18, 19 and 20. According to the present embodiment, the spatial light modulator 5100 is implemented as a deflectable mirror device includes a plurality of mirror elements arranged as a two dimensional mirror array.

Figure 12:
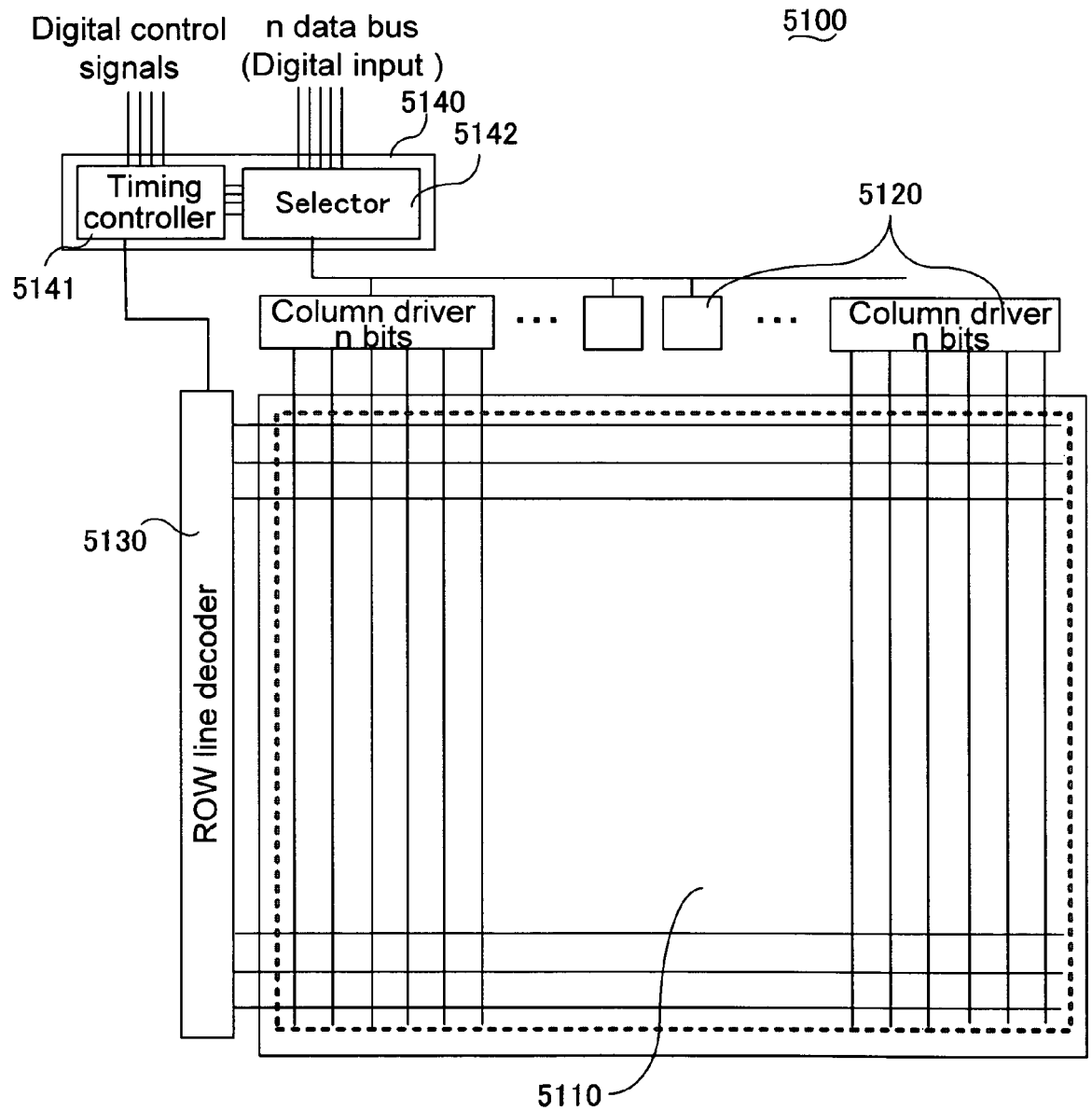
FIG. 12 is a circuit block diagram for showing a layout of the internal configuration of a spatial light modulator according to an embodiment of the present invention.

FIG. 12 is a circuit schematic diagram for illustrating the layout of the internal configuration of the spatial light modulator 5100 according to the present embodiment.

Figure 13:
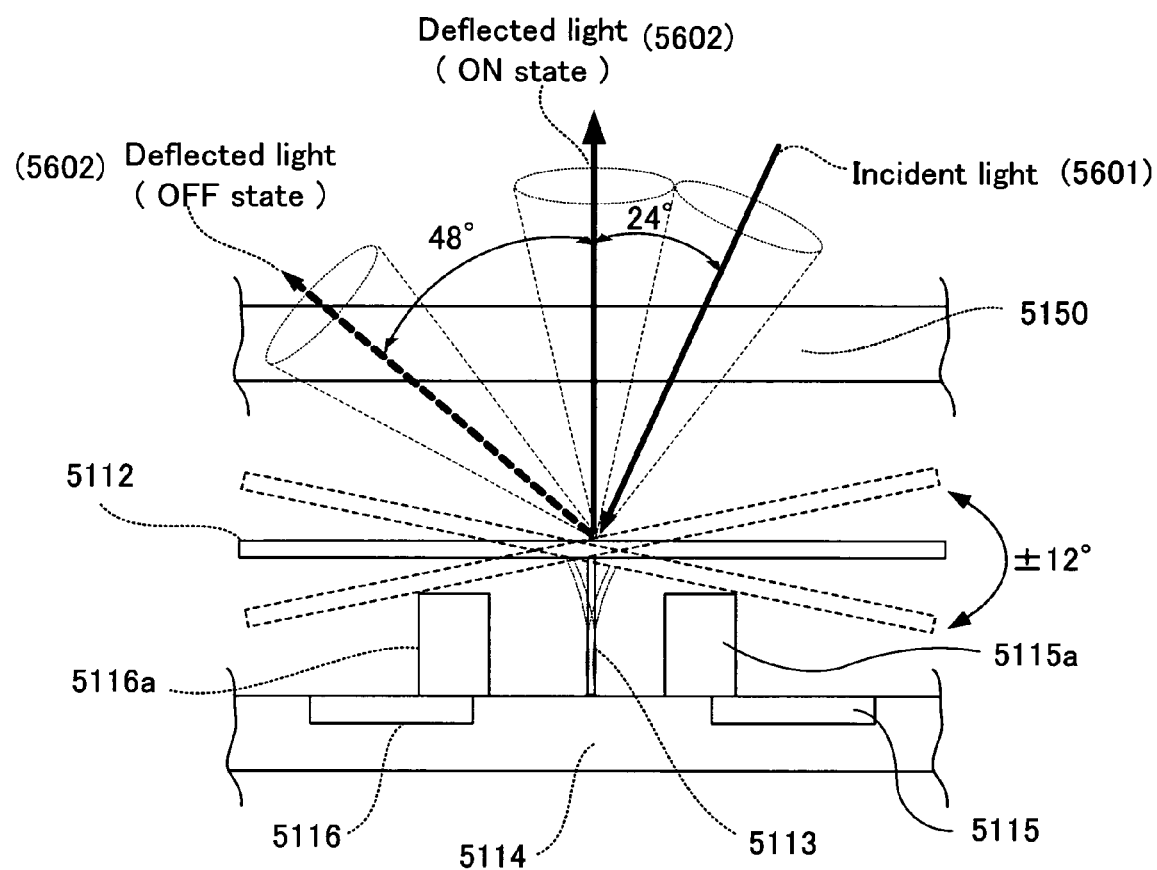
FIG. 13 is a cross-sectional diagram of an individual pixel unit implemented in a spatial light modulator according to an embodiment of the present invention.

FIG. 13 is a side cross sectional view for showing the configuration of an individual pixel unit implemented in the spatial light modulator 5100 according to the present embodiment.

Figure 14:
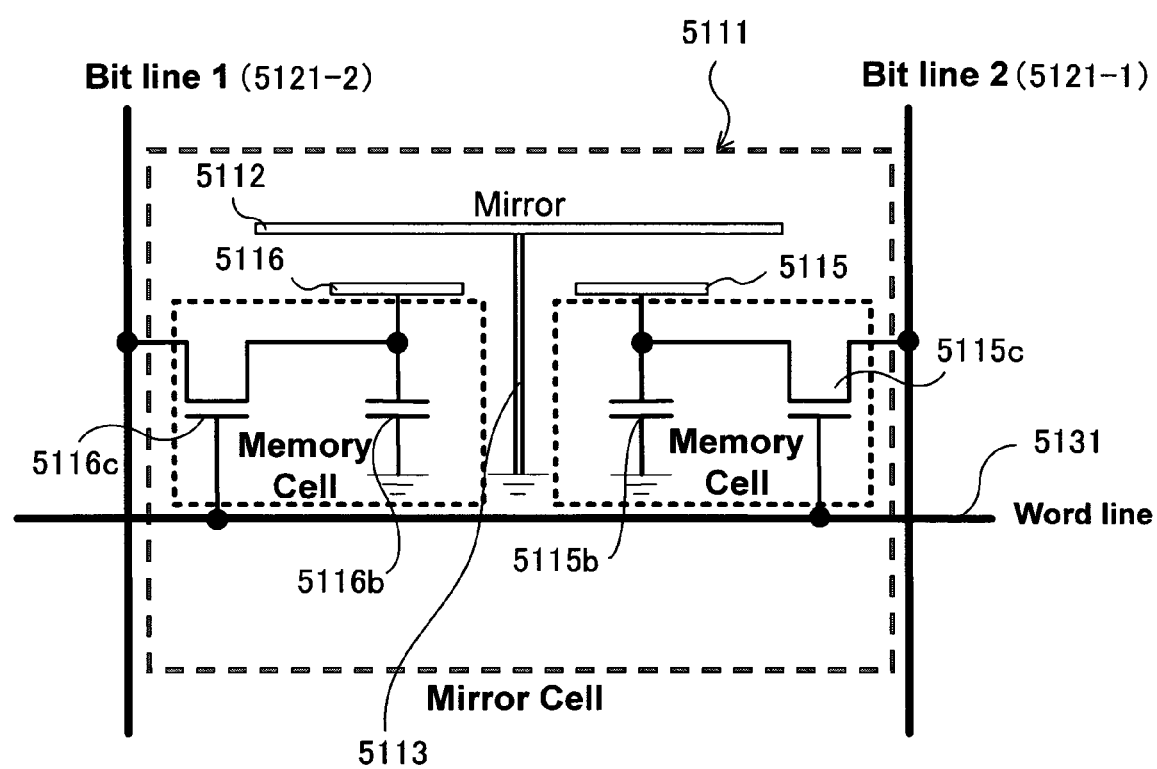
FIG. 14 is a side view functional diagram for showing an individual pixel unit implemented in a spatial light modulator according to an embodiment of the present invention.

FIG. 14 is a cross-sectional diagram of an individual pixel unit constituting the spatial light modulator 5100 according to the present embodiment.

FIG. 12 shows an exemplary embodiment of a spatial light modulator 5100 that includes a mirror element array 5110, column drivers 5120, ROW line decoders 5130 and an external interface unit 5140. The external interface unit 5140 comprises a timing controller 5141 and a selector 5142. The timing controller 5141 controls the ROW line decoder 5130 on the basis of a timing signal from the SLM controller 5530. The selector 5142 supplies the column driver 5120 with digital signal incoming from the SLM controller 5530. In the mirror element array 5110, a plurality of mirror elements are arrayed at the positions where individual bit lines 5121 vertically extended from the column drivers 5120, crosses over the individual word lines 5131 horizontally extended from the ROW line decoders 5130.

As shown in FIG. 13, the individual mirror element 5111 includes a freely deflectable mirror 5112 supported on a substrate 5114 by way of a hinge 5113. The mirror 5112 is covered with a cover glass 5150 for protection.

The mirror further includes an OFF electrode 5116 (and an OFF stopper 5116a) and an ON electrode 5115 (and an ON stopper 5115a). The electrodes and stoppers are symmetrically placed across the hinge 5113 on the substrate 5114. The OFF electrode 5116 attracts the mirror 5112 with a coulomb force by the application of a predetermined voltage and tilts the mirror 5112 to a position of contact with the OFF stopper 5116a. This causes the incident light 5601 incident to the mirror 5112 to reflect in a light path along an OFF direction away from the optical axis of the projection optical system 5400. The ON electrode 5115 draws the mirror 5112 with a coulomb force by applying a predetermined voltage and tilts the mirror 5112 to a position of contact with the ON stopper 5115a. This causes the incident light 5601, incident to the mirror 5112, to be reflected in a light path along the ON direction, to align with the optical axis of the projection optical system 5400.

Figure 15:
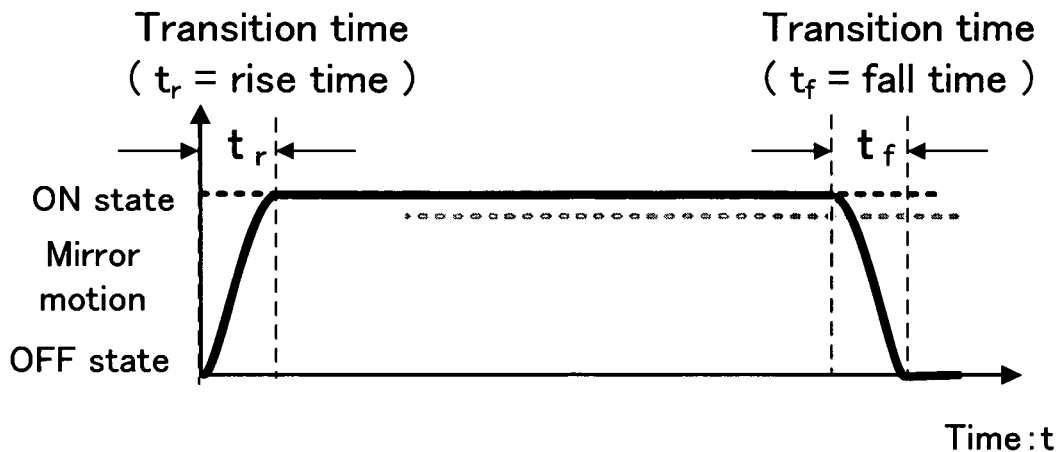
FIG. 15 is a timing diagram for showing the transition between the ON state and OFF state of a mirror in a spatial light modulator according to an embodiment of the present invention.

FIG. 15 is a timing diagram for showing a transition response between the ON and OFF state of the mirror 5112. In the transition from the OFF state, in which the mirror is attracted by the OFF electrode 5116 and contacts the OFF stopper 5116a, to the ON state, in which the mirror is attracted by the ON electrode 5115 and contacts the ON stopper 5115a, a rise time $t_r$ is required before the transition to a complete ON state is reached. Likewise a fall time $t_f$ is required before the transition to a complete OFF state is reached.

The reflection light 5602 is in the transition state in the period between the rise time $t_r$ and the fall time $t_f$. By applying an ON/OFF dual-states control, the light emitted in the transition state generates a light processed by the control system as an uncontrollable interference in controlling a grayscale display. Therefore, the present embodiment is configured to carry out such a control so as to suppress the emission of the adjustable light source 5210, as described later, thereby eliminating a use of the reflection light 5602 in the transition state.

Figure 16:
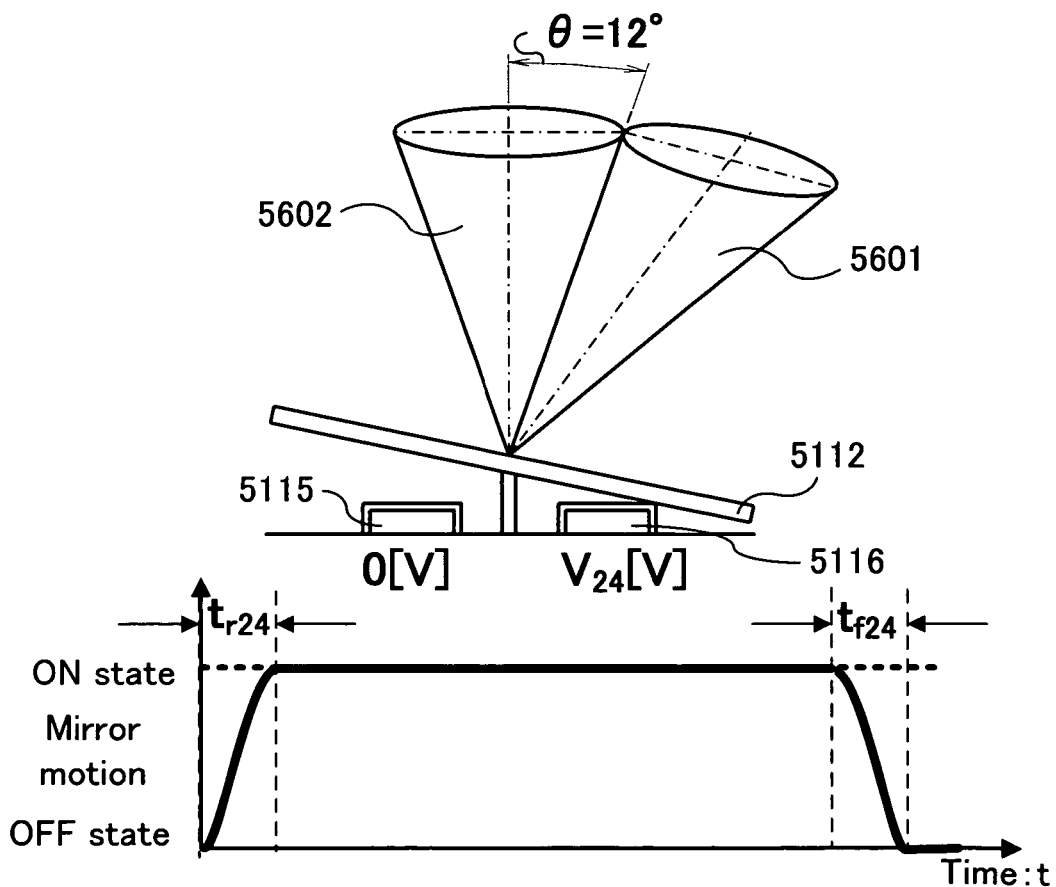
FIG. 16 is a side view diagram for showing the tilt state of a mirror when a non-directional light source, such as a high-pressure mercury lamp or a xenon lamp, is used.

FIG. 16 is a timing diagram, together with a side cross section view of a tilting state of the mirror 5112, implemented with a non-directional light source, such as a high-pressure mercury lamp or a xenon lamp.

According to the conventional technique, the expansions of incident light 5601 and reflection light 5602 has a greater angular range. Therefore, the tilt angle of the mirror 5112 is set at about ±12 degrees, i.e., totally 24 degrees in both directions, in order to increase contrast by avoiding interference between the aforementioned 5601 and 5602. Consequently, both the rise time $t_{r24}$ and fall time $t_{f24}$ are extended in the ON/OFF control of the mirror 5112 and a voltage ($V_{24}$) to be applied to the ON electrode 5115 and OFF electrode 5116 for tilting the mirror 5112 by means of a static electric attraction must also be increased.

Figure 17:
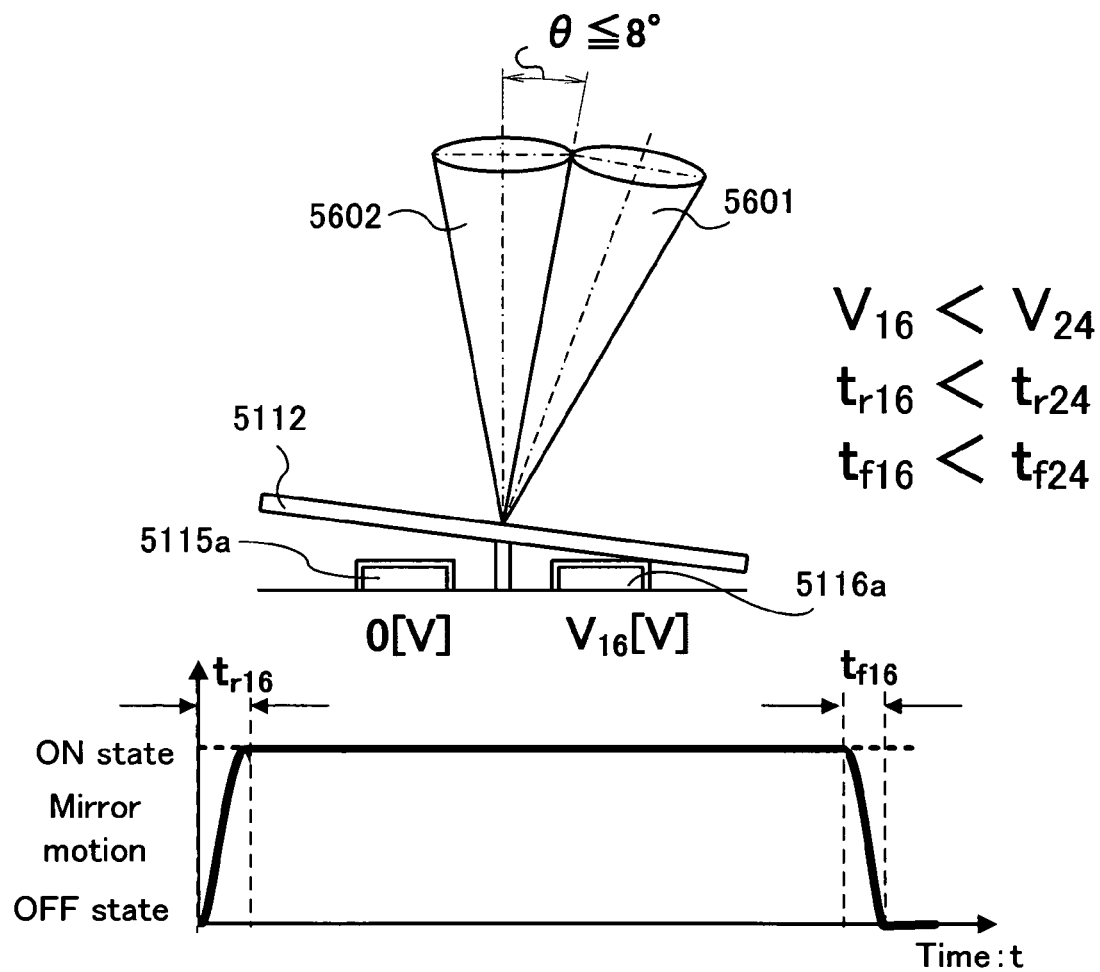
FIG. 17 is a side view diagram for showing the ON/OFF control of a mirror in a spatial light modulator according to an embodiment of the present invention.

FIG. 17 is a timing diagram for showing the ON/OFF control of the mirror 5112 in a spatial light modulator 5100 according to the present embodiment.

The projection apparatus is configured as the adjustable light sources 5210 including the red laser light source 5211, green laser light source 5212, and blue laser light source 5213. All of these light sources have a high coherence of projection and thereby make it possible to decrease the tilting angle θ of the mirror 5112 to about ±8 degrees, 16 degrees in both directions. As a result, the rise time $t_{r16}$ and fall time $t_{f16}$ is less than the conventional rise time $t_{r24}$ and fall time $t_{f24}$.

Also, a voltage ($V_{16}$) applied to the ON electrode 5115 and OFF electrode 5116 for tilting the mirror 5112 by means of a static electric attraction is less than the conventional voltage ($V_{24}$) because the distance between the mirror 5112 and either of the aforementioned electrodes is shortened, as described later.

Figure 18:
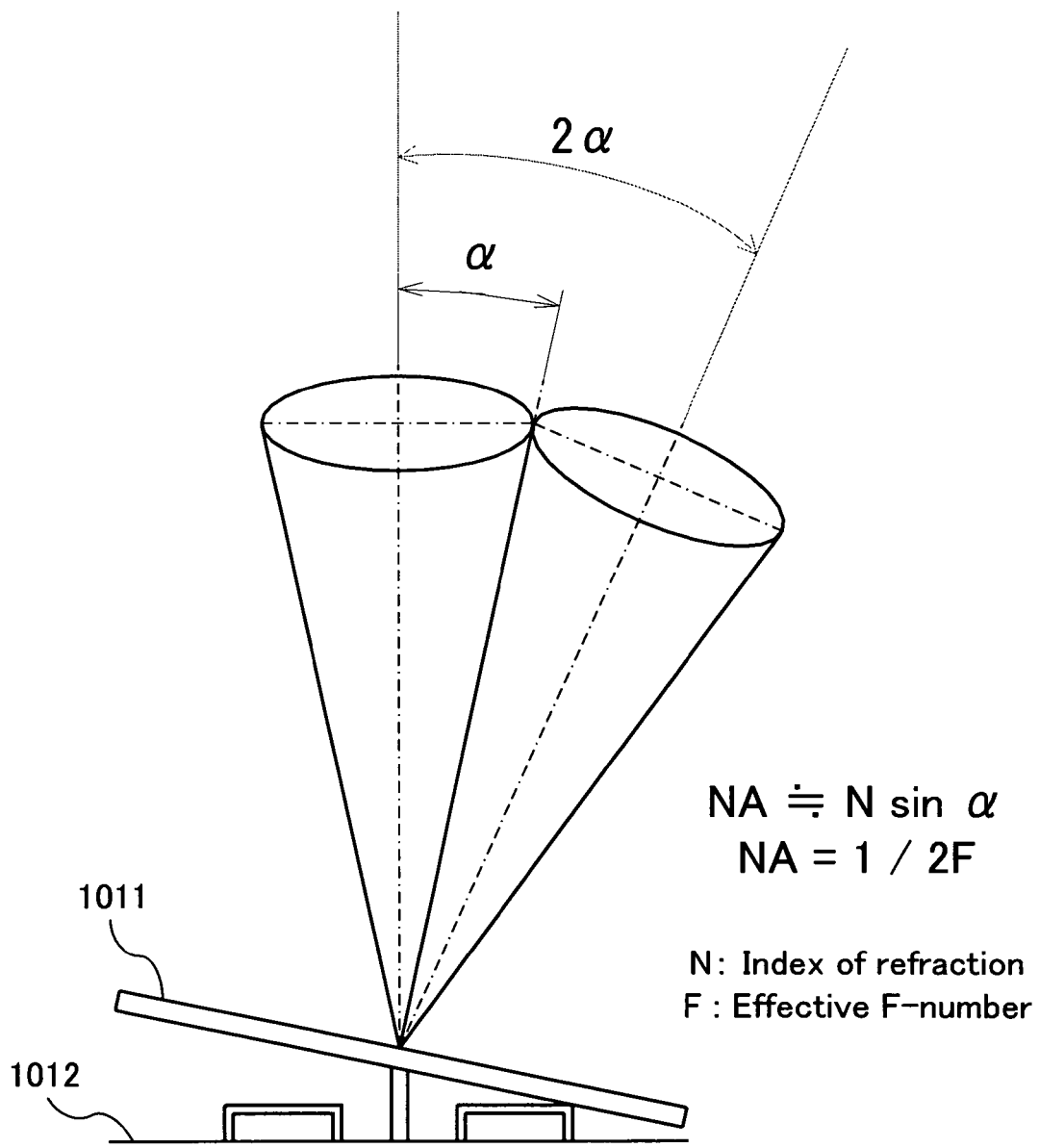
FIG. 18 is a side view diagram for showing the relationship between the numerical aperture NA1 of an illumination light path, the numerical aperture NA2 of a projection light path and the tilt angle $\alpha$ of a mirror.

In the projection apparatus that includes a reflective spatial light modulator implemented with a mirror described above, there is a close relationship between the numerical aperture (NA) NA1 of an illumination light path, the numerical aperture NA2 of a projection light path, and the tilt angle α of a mirror. FIG. 18 shows the relationship between them.

Assuming that the tilt angle α of a mirror 1011 is 12 degrees, when a modulated light reflected by mirror 1011 and incident to the center of the projection light path is set perpendicular to a device substrate 1012, the illumination light is incident from a direction inclined by 2α, that is, 24 degrees, relative to the perpendicular of the device substrate 1012. For the light beam reflected by the mirror to be most efficiently incident to the center of the projection lens, the numerical aperture of the projection light path should be equal to the numerical aperture of the illumination light path. If the numerical aperture of the projection light path is smaller than that of the illumination light path, the illumination light cannot be sufficiently projected into the projection light path. However, if the numerical aperture of the projection light path is larger than that of the illumination light path, the illumination light can be entirely directed. The projection lens then becomes unnecessarily large. Further in this event, the light fluxes of the illumination light and projection light need to be placed apart from each other because the optical members of the illumination system and those of the projection system need to be physically separated. Keeping the above considerations in mind, when a spatial light modulator with the tilt angle of a mirror being 12 degrees is used, the numerical aperture (NA) NA1 of the illumination light path and the numerical aperture NA2 of the projection light path are preferably set as follows:

$$NA1=NA2=\sin \alpha=\sin 12°$$

If the F-number of the illumination light path is F1 and the F-number of the projection light path is F2, then the numerical aperture can be converted into an F-number as follows:

$$F1=F2=1/(2*NA)=1/(2*\sin 12°)=2.4$$

In order to maximize the use of illumination light emitted from a non-coherent light source, such as a high-pressure mercury lamp or a xenon lamp, which is generally used for projection apparatuses, the projection angle of light must be maximized on the illumination light path side. Since the numerical aperture of the illumination light path is determined by the tilt angle of a mirror to be used, it is clear that the tilt angle of the mirror needs to be large in order to increase the numerical aperture of the illumination light path.

There is, however, a problem in that the increase of the tilt angle of mirror results in the increase in the drive voltage for driving the mirror and requires a larger distance between the mirror and the electrode in order to secure a physical space for tilting the mirror. The electrostatic force F generated between the mirror and electrode is given by the following equation:

$$F=(\epsilon*S*V^2)/(2*d^2),$$

where "S" is the area size of the electrode, "V" is a voltage, "d" is the distance between the electrode and mirror and "ε" is the permittivity of vacuum.

The equation shows that the drive force decreases in proportion to the second power of the distance d between the electrode and the mirror. It is possible to increase the drive voltage to compensate for the decrease in the drive force associated with the increase in the distance; conventionally, however, the drive voltage is about 3 to 15 volts in the drive circuit by means of a CMOS process used for driving a mirror and, therefore, a relatively special process such as a DMOS process is required if a drive voltage in excess of about 15 volts is needed. That is not preferable since cost reduction remains a consideration.

Further, in order to reduce the cost of a mirror device, it is desirable to obtain as many mirror devices as possible from a single semiconductor wafer substrate to increase productivity. That is, a decrease in the size of mirror elements reduces the size of the mirror device. It is clear that the area size of an electrode is reduced in association with a decrease in the size of the mirror, which also requires less driving power in accordance with the above equation.

As shown by the above described FIG. 14, an OFF capacitor 5116*b* is connected to the OFF electrode 5116, and the OFF capacitor 5116*b* is connected to a bit line 5121-1 and a word line 5131 by way of a gate transistor 5116*c*, constituting a memory cell. The memory cell has a DRAM (Dynamic Random Access Memory) structure. The memory structure is not limited to DRAM, and may also include, for example, a SRAM (Static Random Access Memory) structure and the like.

Further, an ON capacitor 5115*b* is connected to the ON electrode 5115, and the ON capacitor 5115*b* is connected to a bit line 5121-2 and a word line 5131 by way of a gate transistor 5115*c*.

The turning ON and OFF of the gate transistor 5116*c* and gate transistor 5115*c* are controlled by the word line 5131. Specifically, the mirror elements 5111 on one horizontal row in line with an arbitrary word line 5131 are simultaneously selected, and the charging, and discharging, of the charge in the OFF capacitor 5116*b* and ON capacitor 5115*b* are controlled by the bit lines 5121-1 and 5121-2, respectively. Thereby, the ON and OFF states of the mirrors 5112 of the individual mirror elements 5111 on the present one horizontal row are controlled.

Figure 19:
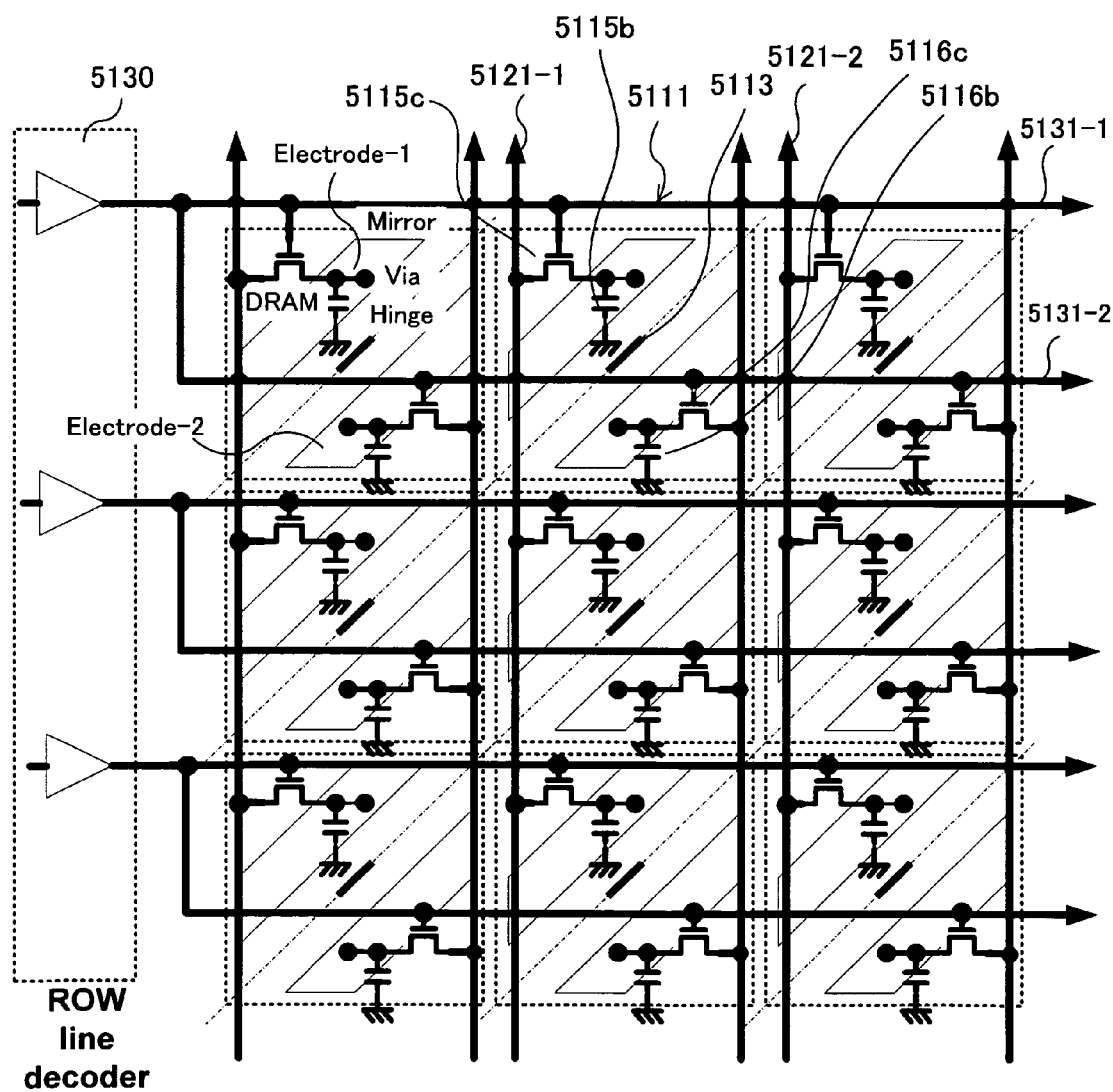
FIG. 19 is a block diagram showing a layout of word lines for controlling a mirror in a spatial light modulator of a modification of an embodiment of the present invention.

FIG. 19 is a schematic diagram for illustrating the layout of word lines for controlling a mirror in a spatial light modulator of a modification according to the present embodiment.

As illustrated in FIG. 19, an alternate spatial light modulator can be configured with common word lines 5131-1 and 5131-2, as the word line 5131, for driving transistor 5115c and transistor 5116c simultaneously. A common drive circuit (not shown) is implemented by the ROW line decoders 5130 to transmit signals and drive the word lines 5131-1 and 5131-2).

As described above, signals received on the word lines 5131-1 and 5131-2 driving the transistor 5115c and gate transistor 5116c. The loading time of a charge to the ON capacitor 5115b and OFF capacitor 5116b through the transistor 5115c and transistor 5116c respectively is reduced. High speed of controlling the mirror 5112 to tilt to different angles between the ON/OFF states or in the oscillation state is achieved.

Figure 20:
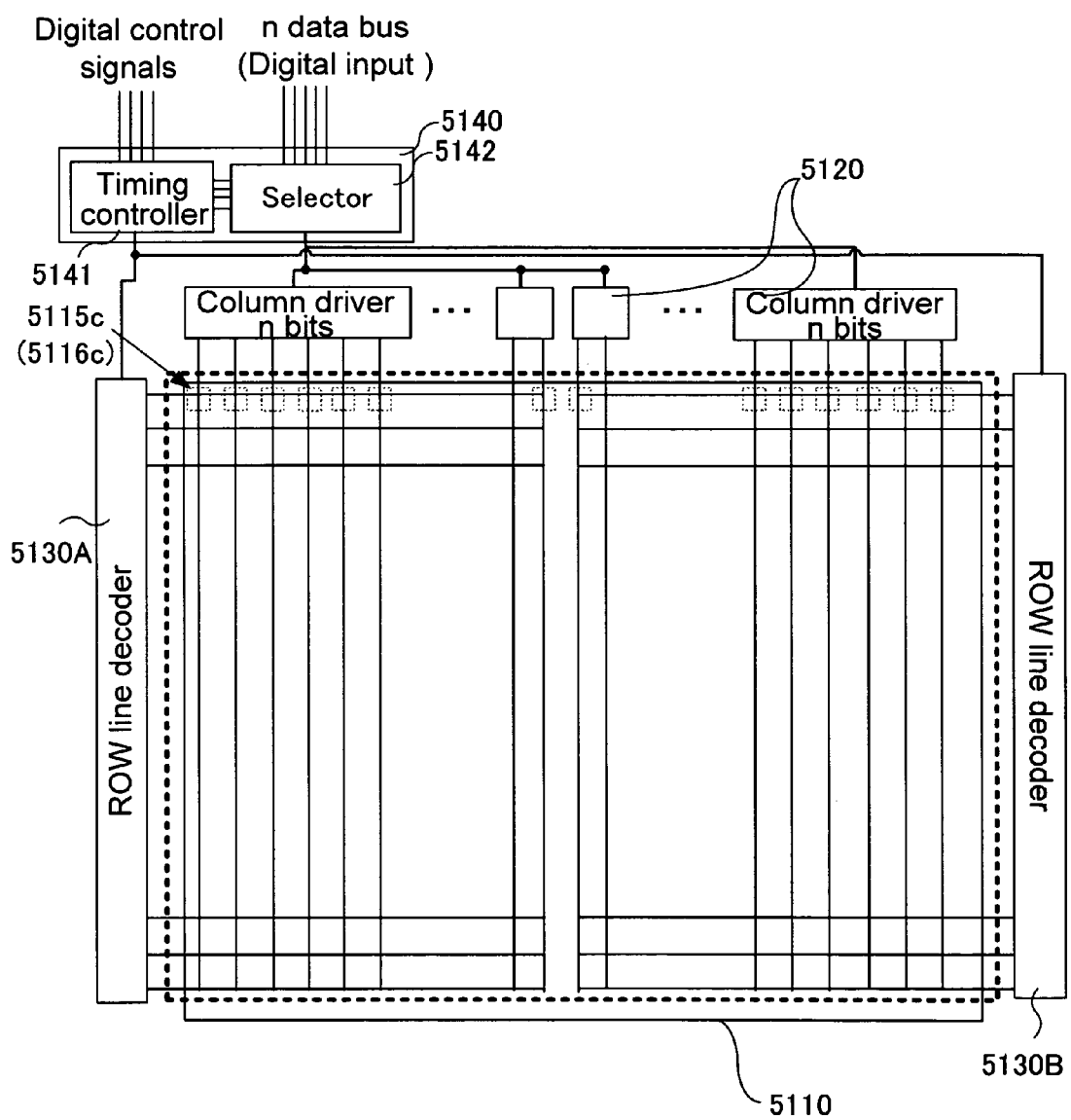
FIG. 20 is a block diagram showing a modification of the configuration of a spatial light modulator according to an embodiment of the present invention.

FIG. 20 is a schematic diagram showing a modified example of the configuration of a spatial light modulator according to the present embodiment. The modified example shown in FIG. 20 is configured with two ROW line decoders 5130A and 5130B sandwiching the mirror array 5110, with the ROW line decoder 5130A controlling half of the mirror elements 5111 arrayed in the mirror element array 5110 and the with ROW line decoder 5130B controlling the remaining half of the mirror elements 5111.

This modified example reduces the loading time of a charge to the ON capacitor 5115b and OFF capacitor 5116b by way of the gate transistors 5115c and 5116c, respectively, thereby tilting the mirror 5112 at a high speed in the ON/OFF and oscillation operations.

Figure 21:
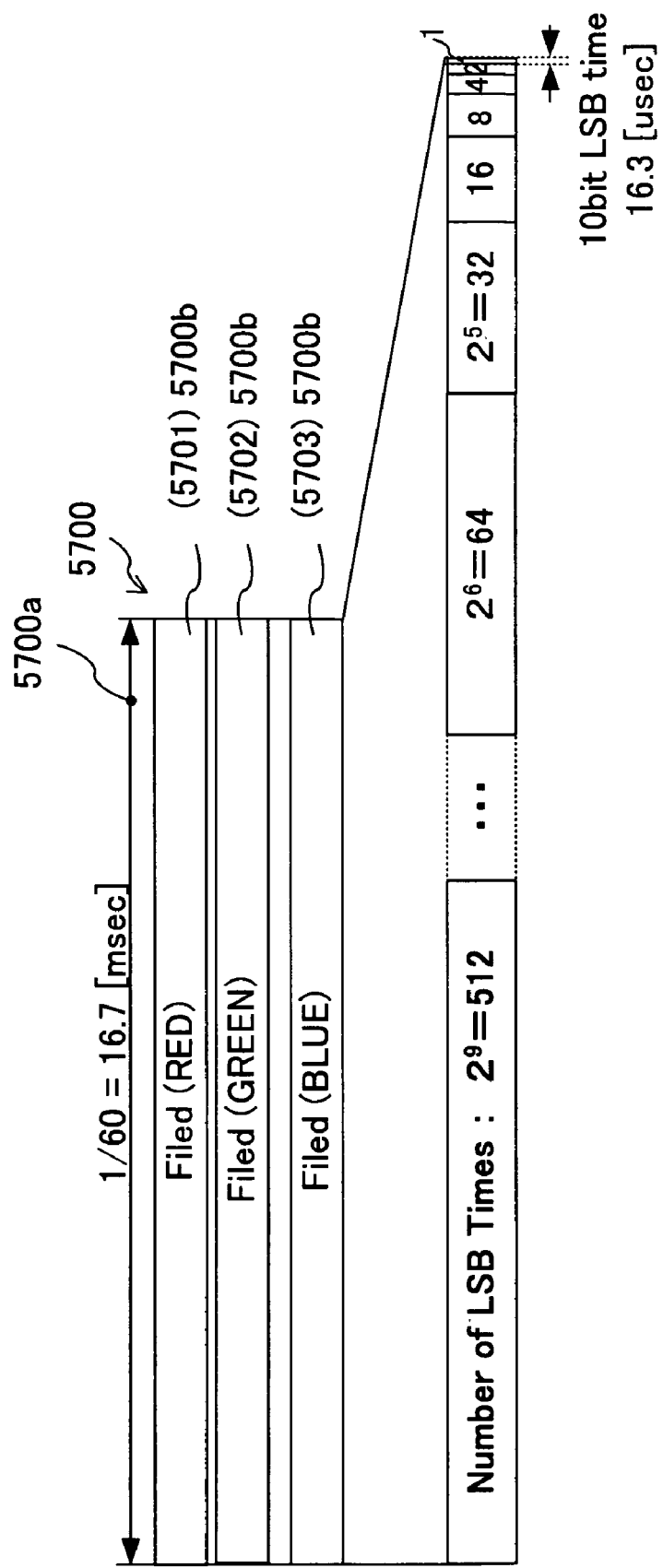
FIG. 21 is a set of data field diagrams showing the data structure of image data used in an embodiment of the present invention.
Figure 23:
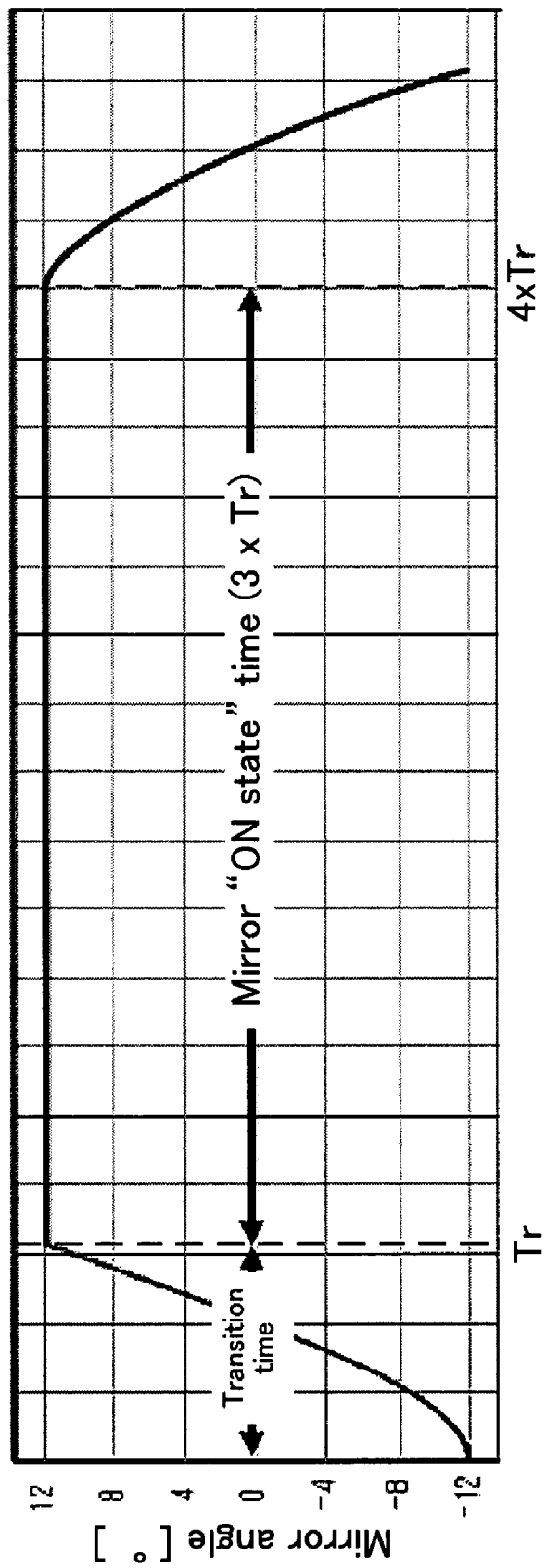
FIG. 23 is a timing diagram showing the transition time in the pulse width modulation of a mirror of the spatial light modulator according to an embodiment of the present embodiment.

Next, an example of the operations of the projection apparatus according to the present embodiment is described, in reference to FIGS. 21, 22 and 23.

Digital video data input 5700 inputted to a video signal input unit 5510 from outside is outputted to a frame memory 5520 and to a video image analysis unit 5550.

An SLM controller 5530 reads the digital video data 5700 received from the frame memory 5520. The controller 5530 converts the digital video data into binary data 5704. The binary data 5704 is pulse width-modulated, or converted into non-binary data 5705 then transmitted as a control signal to a column driver 5120, by way of an external interface unit 5140. The control signal is applied by the spatial light modulator 5100 to control the ON/OFF or oscillation of the mirror 5112.

The pulse width-modulated binary data 5704 is processed to generate a pulse width in accordance with the weighting value of each bit depending on the relative position of the bit in the control word. The non binary data 5705 converted from the digital video data 5700 becomes a bit string that includes continuous bits of "1" corresponding to the level of brightness, and in this bit stream each bit of the non-binary data 5705 has the same weighting factor (e.g., "1").

Furthermore, a sequencer 5540 outputs a synchronous signal, such as VSYNC, which is output from the SLM controller 5530 synchronously with the digital video data input 5700, to the ROW line decoder 5130 of the spatial light modulator 5100.

In this configuration, the displaying/updating of one screen (i.e., one frame) is carried out by the ROW line decoder 5130 for synchronously controlling the ON/OFF or oscillation state of the mirror elements 5111 in one ROW along the word line 5131 of the micromirror 5112.

At the same time, in the case of the above described multi-panel projection apparatuses (comprising three SLMs) 5020, 5030 and 5040, subfields 5700b (which are equivalent to subfields 5701, 5702 and 5703), corresponding to the respective colors R, G and B, simultaneously output to the spatial light modulators 5100, as illustrated in FIG. 21, and the spatial light modulations for the respective colors are simultaneously performed. Also, the above described binary data 5704 or non-binary data 5705 is generated for each field 5700b in this case.

The present embodiment is configured such that the video image analysis unit 5550 of the control unit 5500 1) detects the timing of the change in signal waveforms of the binary data 5704 or non-binary data 5705 from the digital video data input 5700, 2) generates a video image analysis signal 5800 for controlling red laser light source 5211, green laser light source 5212, and blue laser light source 5213, of the adjustable light source 5210, and 3) inputs the generated signal to the light source control unit 5560 by way of the sequencer 5540.

This configuration implements the control for the adjustable light source 5210 operating synchronously with the timing of the change in signal waveforms of the binary data 5704 or non-binary data 5705 of the digital video data input 5700, as described later.

FIG. 22 shows a modification of the control of the spatial light modulator 5100 using non-binary data. In the light source pulse pattern 5812, the heights of the flashing pulse (that is, the emission intensity) of the adjustable light source 5210 are changed so as to gradually decrease in the OFF, ON, and oscillation states of the mirror modulation control waveform 5120a. The adjustable light source 5210 is controlled by pulses to flash (noted as "flashing pulse" hereafter) so as 1) to emit light in the emission intensity $P_4$ during, for example, the OFF period of the mirror modulation control waveform 5120a, 2) to emit light in the emission intensity $P_3$ during the first half of the ON period of the mirror modulation control waveform 5120a, 3) to emit light in the emission intensity $P_2$ in the second half of the ON periodadjustable light source, and 4) to emit light in the emission intensity $P_1$ during the oscillation period of the mirror modulation control waveform 5120a.

Furthermore, the respective turn-on pulse for the emission light intensities $P_4$, $P_3$, $P_2$, and $P_1$ are constituted by the flashing pulse in finer minute cycles. Controlling the adjustable light source 5210 by means of the light source pulse pattern 5812 makes it possible to achieve a more delicate display gray scale than the single gray scale display of the spatial light modulator 5100.

Meanwhile, in FIG. 22, the LSB modulation period is indicated as $T_{LSB}$, a prescribed period is indicated as $t_{SET}$, the rise time of the mirror modulation control waveform 5120a is indicated as $T_r$, and its fall time is indicated as $t_f$, and the delay time for the control timing of the mirror element 5111 included in a different row in the mirror element array 5110 is represented as $t_D$.

In the multi-panel projection apparatus including the spatial light modulators 5100 for the respective colors and which uses the adjustable light source 5210 comprising a red 5211, green 5212, and blue 5213 laser light source, as that shown in FIG. 2A, the display period of a sub-frame corresponds to the least significant bit (LSB) for attaining a 10-bit individual color display grayscale is 16.3 [μsec] (refer to FIG. 21).

In order to limit the transition period between the individual deflection states of a mirror to no more than the equivalent of ⅕*LSB in a common mirror device, it is necessary to achieve a "LSB display period"=4*$t_r$ (where $t_r$ is a rise time) as shown in FIG. 23, requiring the transition time of the mirror 5112 be limited to no more than 4.1 [μsec].

Note that in the projection apparatus according to the present embodiment, both the timing controller functioning as a control means (such as a light source control unit 5560) and spatial light modulator controller (such as a SLM controller 5530), or all the timing controllers, spatial light modulator controller and light source driver (such as the light source drive circuit 5570), are preferably incorporated on the same semiconductor chip or as proximity circuits on the same circuit substrate. The reason is that adjustable light source and spatial light modulator are controlled in high speed in keeping with the higher resolution and higher grade of gray scale display desired, and the adjustable light source is controlled synchronously with the modulation operation of the spatial light modulator. Therefore, the influences of a circuit delay, a wiring delay in a signal transfer, et cetera, on a timing signal used for the aforementioned control need to be reduced as much as possible. Alternatively, the configuration may be such that the light source control circuit (such as the light source unit 5560) and at least a part of the spatial light modulator control circuit (such as the SLM controller 5530) are implemented on the same semiconductor chip or on the same circuit board, or, the light source (such as the adjustable light source 5210) and at least a part of the light source drive circuit (such as the light source drive circuit 5570) are implemented on the same semiconductor chip or on the same circuit board.

Next, the characteristic operations of the projection apparatus according to the present embodiment are described in detail, in reference to FIGS. 24, 25, 26, 27 and 28.

The following is a description of control operations for the spatial light modulator and adjustable light source in the case of configuring the projection apparatus according to the present embodiment as a three-panel projection apparatus as described in FIG. 3B, as one example of the operation of the projection apparatus according to the present embodiment.

To begin with, an example of the control operations for the spatial light modulator and adjustable light source in the conventional three-panel projection apparatus is described, for the purpose of highlighting the differences between the apparatus according to the present embodiment and the conventional three-panel projection apparatus.

Figure 24:
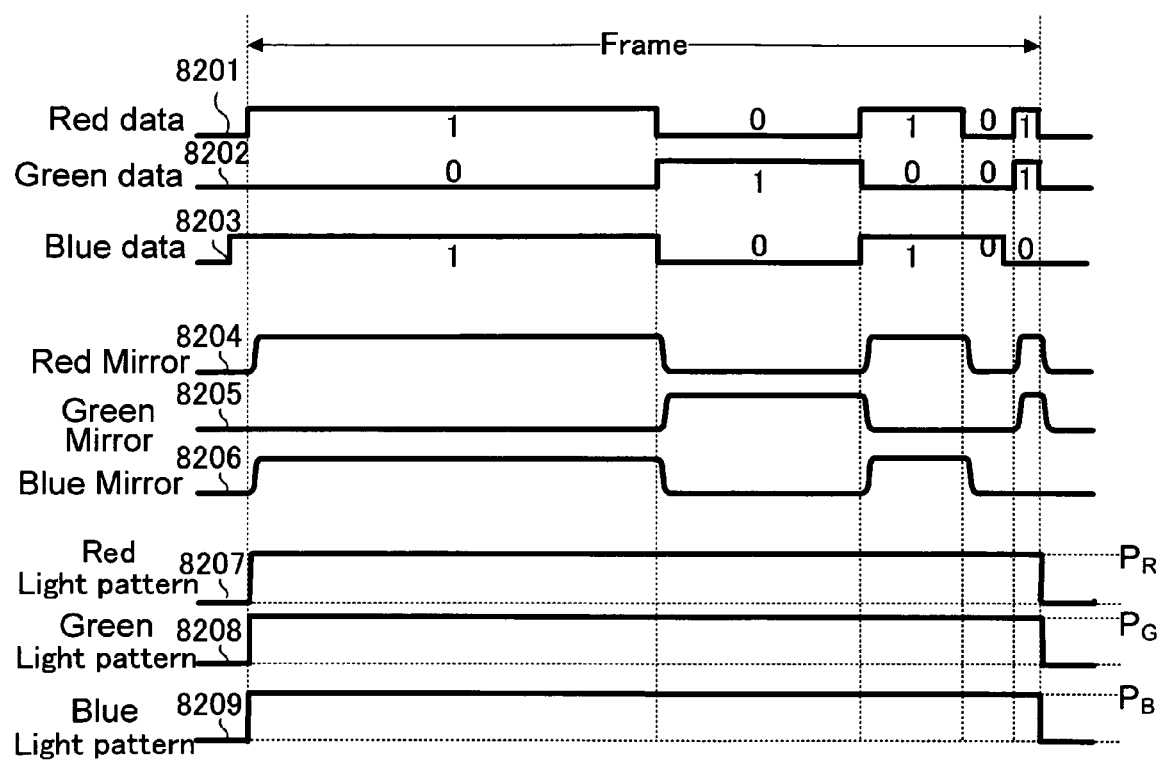
FIG. 24 shows timing diagrams for describing the control operations for a spatial light modulator and an adjustable light source in a conventional three-panel projection apparatus.

FIG. 24 is a diagram that illustrates an exemplary control operation. This conventional control process is based on an assumption that the gray scale of the respective colors, i.e., red (R), green (G) and blue (B), in one frame period is 5-bit.

In the example shown in FIG. 24, binary data 8201, binary data 8202 and binary data 8203 are input as ON/OFF control signals for the respective one mirror elements of the spatial light modulators of respective colors R, G and B in one frame period. The control process is carried out with the light source patterns of the adjustable light sources of the respective colors R, G and B are controlled according to a light source pattern 8207 of an output $P_R$, a light source pattern 8208 of an output $P_G$ and a light source pattern 8209 of an output $P_B$, respectively. Then, according to the control process, the ON/OFF state of one mirror element is corresponding to the mirror modulation control waveform 8204, mirror modulation control waveform 8205 and mirror modulation control waveform 8206, for the spatial light modulators of the respective colors R, G and B. The mirror modulation control waveform 8204, mirror modulation control waveform 8205 and mirror modulation control waveform 8206 are in accordance with the binary data 8201, binary data 8202 and binary data 8203, respectively.

With such a control process, only the light of G is projected onto a screen for over a prescribed period according to the contents of the pieces of binary data 8201, 8202 and 8203. Such projection may produce an image display with a color break that may occur when a color display is projected with a single-panel projection apparatus. Furthermore, different from a single-panel projection apparatus, the conventional three-panel projection apparatus is configured to simultaneously carry out the spatial light modulations of the respective colors R, G and B in parallel for over the period of one frame. Therefore, the light of one color may be projected onto a screen for over the period that is no less than the case of the single-panel projection apparatus depending on the contents of the respective pieces of binary data of the individual colors. Furthermore, there may be circumstances when there is a period of image projection only the light of R onto a screen, only the light of G on the screen or only the light of B on the screen. As a result, a spatial light modulation similar to the case of the single-panel projection apparatus may sometimes occur. In such a case, a color break may frequently occur.

Accordingly, a three-panel projection apparatus according to the present embodiment is configured to carry out control processes for the spatial light modulator and adjustable light source, as described in the following. The multiple panel system is implemented to eliminate an occurrence of color break that may occur due to the discontinuities of the respective pieces of binary data to display the individual colors.

Figure 25:
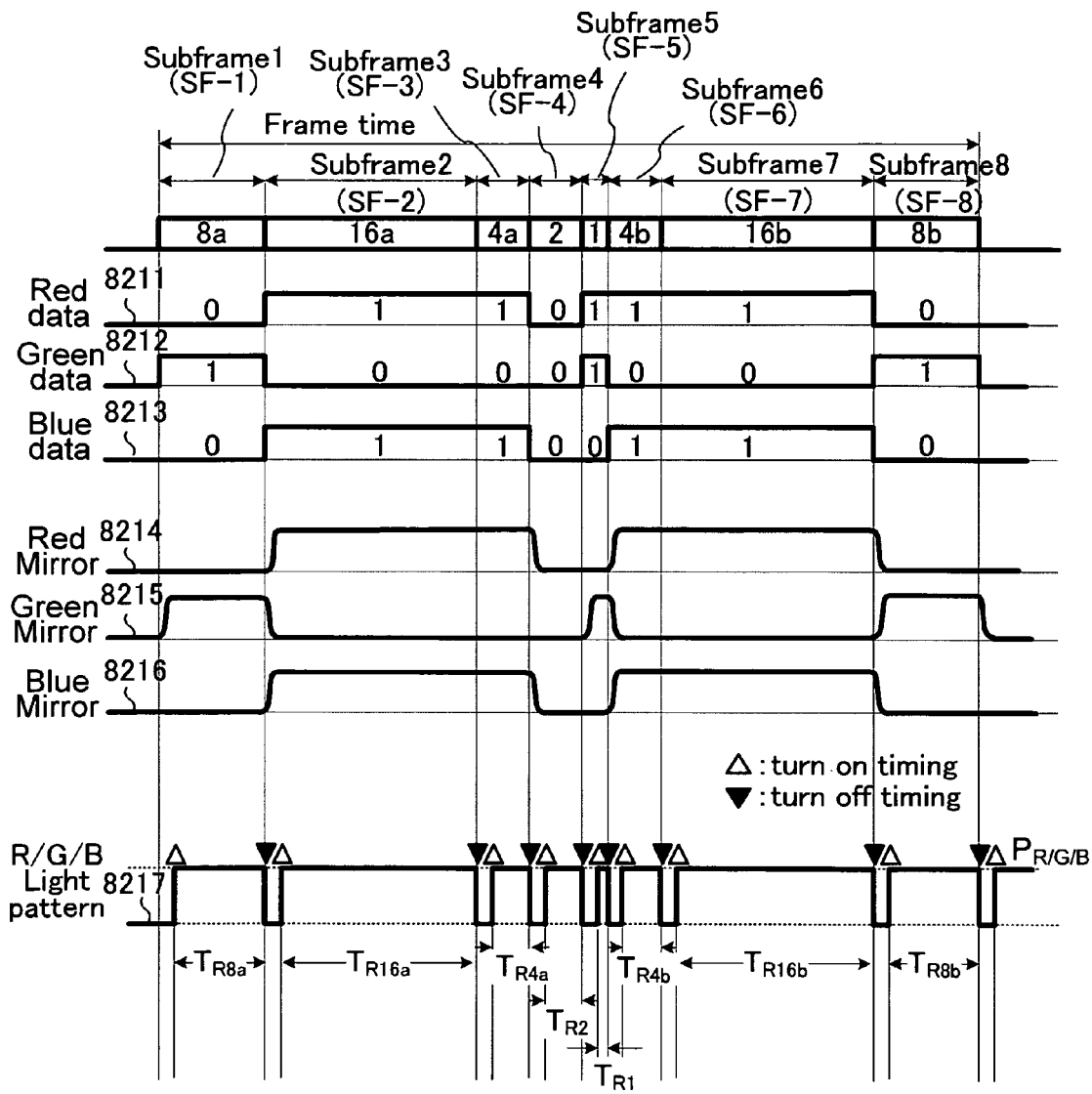
FIG. 25 shows timing diagrams for describing the control operations for a spatial light modulator and an adjustable light source in a projection apparatus according to an embodiment of the present invention.

FIG. 25 is a timing diagram for illustrating the control process. Note that the present embodiment also assumes that the display gray scale of the respective colors R, G and B in one frame period is 5-bit.

In the three-panel projection apparatus according to the present embodiment, an SLM controller 5530 divides one frame into a plurality of sub-frames. The subfields are shown as SF-1 through SF-8 in a manner that the spatial light modulator 5100 has at least one modulation state as shown in FIG. 25. The subfields SF-1 and SF-8 correspond to the fourth-bit grayscale bit, and when the sub-frame is further divided into half, one subfield is SF-1, while another subfield is SF-8. The subfields SF-2 and SF-7 are sub-frames corresponding to the fifth-bit grayscale bit (i.e. the MSB grayscale bit), and when the sub-frame is further divided into half, one subfield is SF-2, while another subfield is SF-7. The subfields SF-3 and SF-6 each are sub-frames corresponding to the third-bit grayscale bit, and when the sub-frame is further divided into half, one subfield is SF-3, while another subfield is SF-6. The subfield SF-4 is a sub-frame corresponding to the second-bit grayscale bit. The subfield SF-5 is a sub-frame corresponding to the first-bit grayscale bit, i.e., the LSB grayscale bit.

As described above, the SLM controller 5530 divides one frame into eight sub-frames. Therefore, the respective pieces of binary data of individual colors R, G and B shown in FIG. 24 are shown as binary data 8211, binary data 8212 and binary data 8213, which are shown in FIG. 25.

With the conversion described above, the ON/OFF state of one mirror element of the spatial light modulators 5100 of the respective colors R, G and B is controlled according to the mirror modulation control waveform 8214, the mirror modulation control waveform 8215, The mirror modulation control waveform 8216 and these waveforms are in turn generated according to the binary data 8211, binary data 8212 and binary data 8213, respectively.

Furthermore, in the exemplary embodiment of the three-panel projection apparatus the light source control unit 5560 includes a timing controller to carryout a control process. Each of the adjustable light sources (i.e., the red laser light source 5211, green laser light source 5212 and blue laser light source 5213) projects at least one time of pulse emission during a sub-frame period as shown in the light source pattern 8217 of an output P (i.e., the R, G and B—light source patterns of outputs $P_R$, $P_G$ and $P_B$). The control process controls the respective adjustable light sources 5210 during the emission are set at the respective intensities $P_R$, $P_G$ and $P_B$ in accordance with the adjustable light sources 5210 of the respective colors R, G and B. The optical system and the visibility of an observer (not shown in a drawing herein) are taken into consideration for determining the turn-on period of the respective adjustable light sources for the respective sub-frames. The sub frames SF-1 through SF-8 are set at the same (i.e., $T_{Rbn}=T_{Gbn}=T_{Bbn}$) and such that the turn-on timing and turn-off timing of the respective adjustable light sources 5210 are similar to one another. Therefore, a common control operation is carried out for the respective adjustable light sources 5210.

The control process as described for the spatial light modulator and adjustable light sources divide each frame into a plurality of sub-frames. The control processes then perform the spatial light modulations of the respective colors R, G and B for each sub-frame to control the emission timings of individual colors to be coincident within each sub-frame period. A period is therefore subdivided into multiple subfields in which only the light of one color is projected onto a screen. The control process thus eliminates a circumstance in which the light of only one color is projected onto the screen for an extended period of time, as in the case of the conventional three-panel projection apparatus. The control process can therefore suppress an occurrence of color break.

Figure 26:
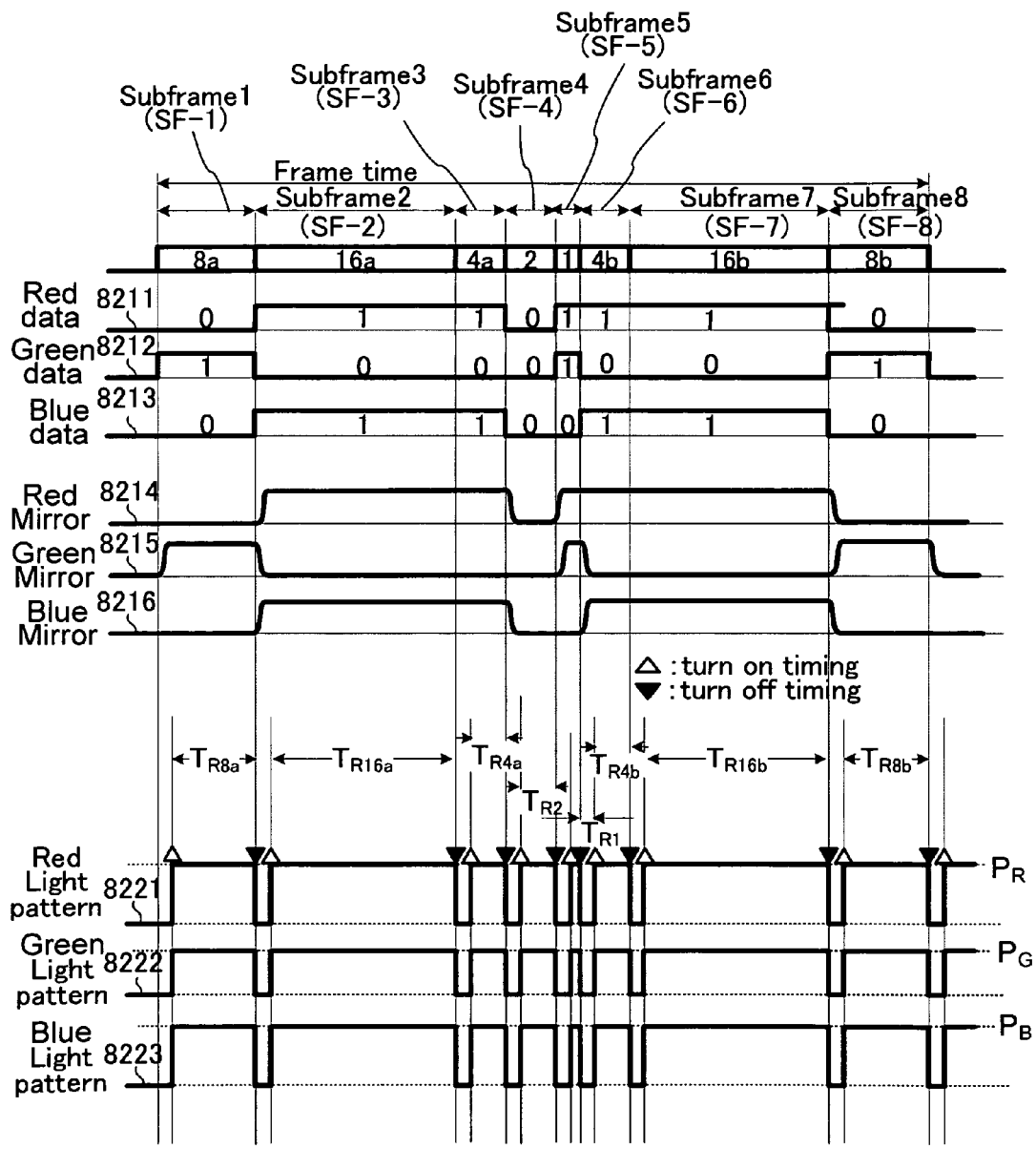
FIG. 26 shows timing diagrams for showing the modified control operations for the spatial light modulator and adjustable light source shown in FIG. 25.

FIG. 26 is a timing diagram for showing a modified embodiment of the control process for controlling the spatial light modulator and adjustable light source from the control process shown in FIG. 25. In the modified embodiment shown in FIG. 26, only the control process for the adjustable light source 5210 is different from the control operation shown in FIG. 25. The control process for the adjustable light source 5210 shown in FIG. 26 includes what is shown in the figure for specific light source control pattern, in the case of the outputs of the individual adjustable light sources 5210 when the light emissions are different, as indicated by a red (R) light source pattern 8221 with an output $P_R$, a green (G) light source pattern 8222 with an output $P_G$ and a blue (B) light source pattern 8223 with an output $P_B$. Furthermore, the respective outputs are set as $P_R > P_B > P_G$. Other control processes are the same as shown in FIG. 25.

Figure 27:
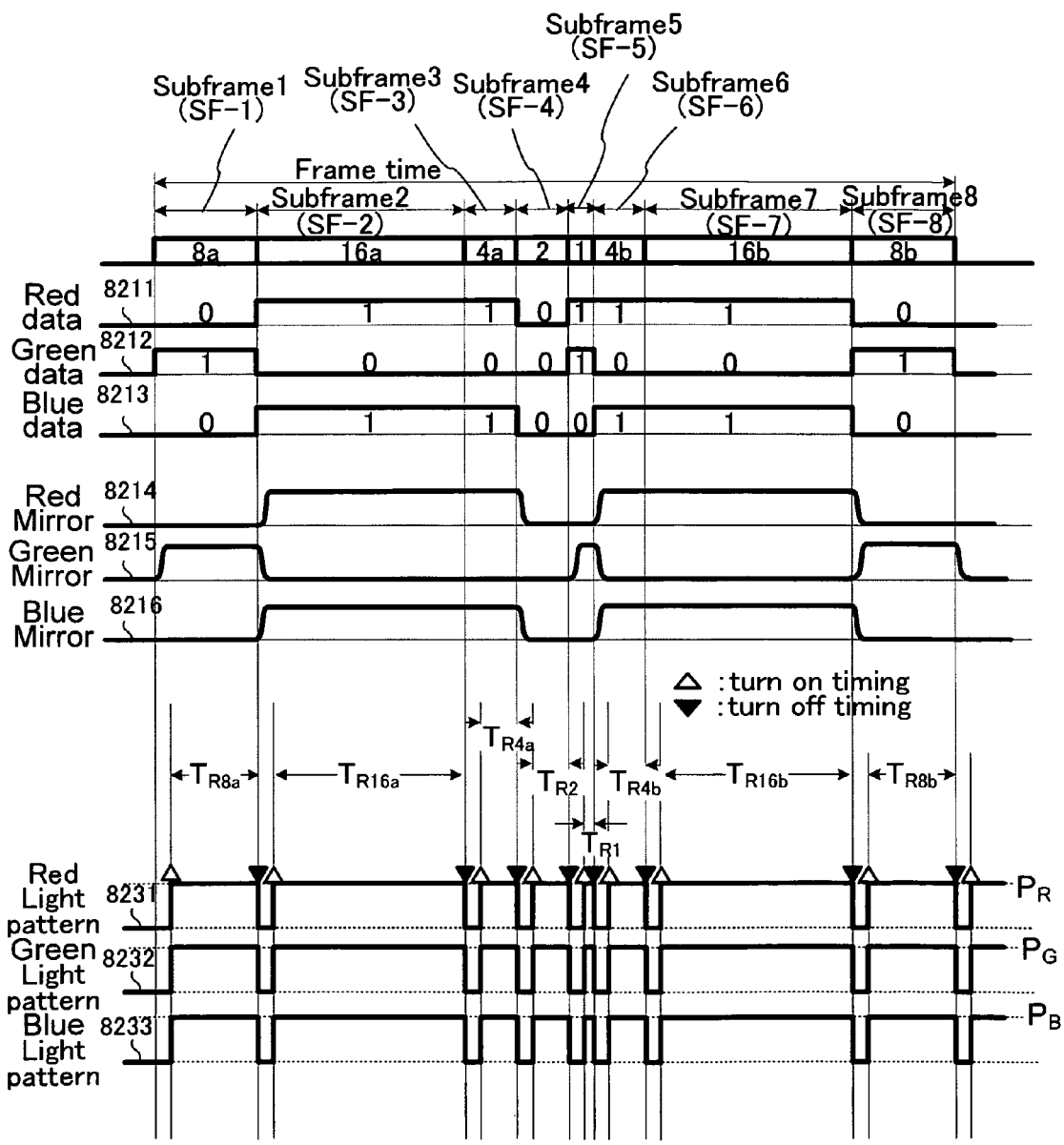
FIG. 27 shows timing diagrams for showing the modified control operations for the spatial light modulator and adjustable light source shown in FIG. 25.

FIG. 27 is a timing diagram for showing another modified embodiment of the control processes for controlling the spatial light modulator and the adjustable light source shown in FIG. 25. Also in the modified embodiment shown in FIG. 27, only the control processes for the adjustable light sources 5210 is different from the control operation shown in FIG. 25. The control processes for the adjustable light sources 5210 shown in FIG. 27 are such that the turn-on periods of the respective adjustable light sources 5210 for the respective sub-frames SF-1 through SF-8 are different ($T_{Rbn} > T_{Gbn} > T_{Bbn}$). The subfields are presented by an R light source pattern 8231 with an output $P_R$, a G light source pattern 8232 with an output $P_G$ and a B light source pattern 8233 with an output $P_B$. Also in this exemplary embodiment, the control process sets the turn-on timing and turn-off timing of the respective adjustable light sources 5210 for each sub-frame are also different. As a result of the control processes, the emission periods of the light sources of the respective colors are individually controlled. Therefore, the color synthesis of the final display image can be adjusted by using the emission period in addition to using the emission light intensity of each color. Therefore, a fine color adjustment may be carried out. Other control processes are the same as those shown in FIG. 25. Furthermore, the control processes for the adjustable light sources shown in FIG. 27 may alternatively be controlled to differentiate only the turn-on timings of the respective adjustable light sources 5210 for the respective sub-frames SF-1 through SF-8. The control processes may also differentiate only the turn-off timings of different colors as well.

According to the control processes shown in FIGS. 26 and 27, the color break of an image display is suppressed by dividing the frame of display cycles into subfields such that the display of a single color for a prolong time period is prevented. The control processes shown in the above-described FIGS. 25 through 27 control an integrated light intensity of the pulse emission during the period of each sub-frame in accordance with the weighting of each bit of display data. The integrated light intensity is therefore determined by an output intensity of the pulse emission that is in turn determined in accordance with the weighting. Furthermore, the output intensity may be alternately determined in accordance with the visibility. The control process shown in the above-described FIGS. 25 through 27 illustrate the control signal for the mirror element as the binary data. A similar control process may be implemented with the control signal implemented as non-binary data.

Figure 28:
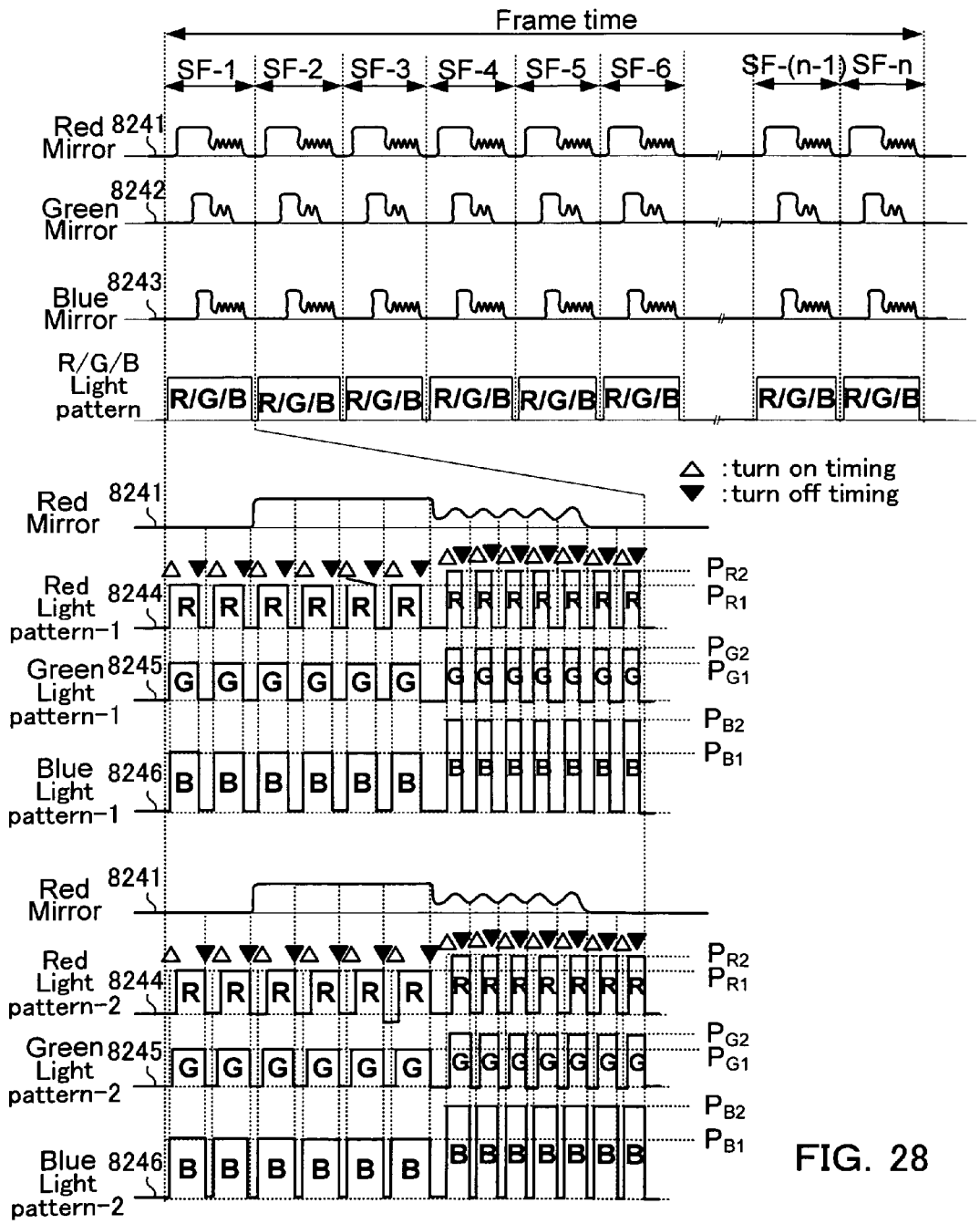
FIG. 28 shows timing diagrams for showing the control operations for the spatial light modulator and adjustable light source when the control signal for a mirror element is non-binary data.

FIG. 28 is a timing diagram for illustrating the control processes for controlling the spatial light modulator and adjustable light source when the control signal for a mirror element is non-binary data. As shown in FIG. 28, when the control signal for a mirror element is non-binary data, the SLM controller 5530 divides one frame into a plurality of sub-frames. The spatial light modulator 5100 has at least one modulation state in each subframe, and the light source control unit 5560 carries out to control each of the adjustable light sources 5210 (i.e., the red laser light source 5211, green laser light source 5212 and blue laser light source 5213) to carry out at least one time of pulse emission during the period of a sub-frame.

In the exemplary control process shown in FIG. 28, one frame is divided into a plurality of sub-frames (i.e., SF-1 through SF-n), and the non-binary data is inputted to generate the corresponding control state to operate the mirror element of the spatial light modulator 5100 in a time slice to project each of the individual colors R, G and B according to the ON, OFF and oscillation control state in each sub-frame for each mirror element. FIG. 28 shows the mirror modulation control waveform 8241, the mirror modulation control waveform 8242 and the mirror modulation control waveform 8243 for controlling the modulation of the mirror element to display the R, G and B color respectively.

Furthermore, each of the adjustable light sources 5210 that includes the 5211, green 5212 and blue 5213 laser light source, is controlled to project a plurality of light pulses. The turn-on timings and turn-off timings during each sub-frame period are coincided as shown by an R light source pattern 8244, a G light source pattern 8245 and a B light source pattern 8246. In this specific example, the individual adjustable light sources 5210 are controlled to project light pulses with a narrow pulse width. The light source is triggered to project the light pulses with narrow pulse width at the time when the mirror element is changed from the ON state over to oscillation state within each sub-frame period. Further, the individual adjustable light sources 5210 are controlled to project different light pulses in each sub-frame period (i.e., $P_{B1} > P_{R1} > P_{G1}$; $P_{B2} > P_{R2} > P_{G2}$). Each frame is therefore divided into several sub-frames for controlling the spatial light modulator and the adjustable light sources. Furthermore, the spatial light modulator modulates the projections of light with different colors R, G and B in each sub-field when the control signal for the mirror element is non-binary data. The light pulses of the respective colors are coincident within each sub-field period thus dividing a period when the light of only one color is projected onto a screen to suppress an occurrence of a color break.

The control operation shown in the bottom half of FIG. 28 exemplifies that it is also possible to apply, as pulse emission of the individual adjustable light sources carried out during the period of each sub-frame, the pulse emission control for the adjustable light source performed during the period of each frame in the case of controlling the spatial light modulator using non-binary data described above. In the present operation example, by the control operation for the spatial light modulator and the adjustable light sources, each frame is divided into a plurality of sub-frames, and the spatial light modulations for the respective colors R, G and B are modulated in the respective sub-frames and the turn-on timings of the respective colors in each sub-frame period are controlled to be different, while the turn-off timings are controlled to be coincident.

In addition, while the adjustable light sources perform a single pulse emission in each of the divided sub-frame periods in the spatial light modulator in the present operation example, FIG. 22 shows a plurality of successive pulse emissions with each pulse emission in each of the sub-frame periods as the pulse emission period may also be performed.

As described above, the projection apparatus according to the present embodiment includes two light sources having different wavelengths, a light source control circuit for performing pulse modulation control for the light source, at least two spatial light modulators in which a plurality of pixel elements are arranged in an array, a spatial light modulator control circuit for selectively controlling a modulation state of the respective pixel elements in each of the spatial light modulators, in accordance with image data corresponding to the respective pixel elements, and the light source control circuit may perform the pulse modulation control for the light source so that a starting timing of a pulse emission period, in which a pulse emission is performed with an illumination light of at least one of the wavelengths in the light source, differs from a modulation control timing of the pixel element of the spatial light modulator.

The light source control circuit may also controls the light source to perform a pulse emission with a pulse width smaller than the modulation period of the spatial light modulator, with the modulation period corresponding to the timing of pulse emission period the spatial light modulator control circuit may also control the respective pixel elements to maintain a designated modulation state during the respective pulse emission period. The light source control circuit may also control the light source to carry out pulse emission with a pulse width smaller than a minimum modulation period of the spatial light modulator in every pulse emission period. The light source control circuit may also control the light source to coincide the starting timings and/or ending timings of the pulse emission periods of all of the wavelengths from the light source. The light source control circuit may also control the light source to change a pulse emission state for at least one of the wavelengths in at least one pulse emission period. The light source control circuit may also control the light source to change a pulse emission state in the pulse emission periods corresponding to the respective wavelengths in the light source.

The spatial light modulator control circuit may also divide each frame period corresponding to the image data into a plurality of sub-frame periods, in which the spatial light modulator maintains one modulation state, and the light source control circuit may also perform the pulse modulation control for the light source so that the light source performs at least one pulse emission within each sub-frame period. The spatial light modulator control circuit may also divide a frame into sub-frames, a number of sub-frames being equal to or more than a number of gray-scale bits of image data corresponding to the respective wavelengths of the light source, and the light source control circuit may also perform the pulse modulation control for the light source so that each integrated light intensity of pulse emission in all the sub-frames periods, corresponding to respective gray-scale bits of the image data, has a ratio that is equal to a ratio of weighting of the respective gray-scale bits. The configuration may also be such that the light source control circuit and at least a part of the spatial light modulator control circuit are implemented on the same semiconductor chip or on the same circuit board. The light source control circuit may also include a light source drive circuit for driving the light source, and the configuration may also be such that the light source and at least a part of the light source drive circuit are implemented on the same semiconductor chip or the same circuit board. The pixel element may also be configured for modulating an illumination light from the light source, having modulation states including an ON state, in which a reflected light of the illumination light is directed to a projection light path, an OFF state, in which the illumination light is not directed to the projection light path, or an oscillation state, involving oscillation between the ON state and OFF state. The spatial light modulator control circuit may also control the spatial light modulator in a plurality of control periods, including different modulation states of the pixel element in each frame period, and the light source control circuit may also perform the pulse modulation control for the light source so that the light source changes a pulse emission state in at least one of the control periods. The spatial light modulator control circuit may also convert the image data from binary data to non-binary data and control the spatial light modulator in accordance with the non-binary data. The light source may also be a semiconductor light source further comprising a plurality of sub-light sources are arranged in an array.

The light source control circuit may also determine a pulse emission state of the respective wavelengths in the light source in accordance with the visual perception of the human eye with respect to the different wavelengths.

The light source control circuit may also perform the pulse modulation control for the light source so that both a turn-on timing and a turn-off timing, or either the turn-on timing or the turn-off timing, of a pulse emission of at least one of the wavelengths differ(s) from a modulation control timing of the pixel element of the spatial light modulator.

The spatial light modulator control circuit may also perform a control so that the respective pixel elements in each of the spatial light modulators maintain a desired modulation state at least during a period in which pulse emissions of the respective wavelengths in the light source overlap.

While the present invention has been described above in detail, the present invention is not limited to the embodiments described above, and may, of course, be improved and modified in various manners within the scope and the spirit of the present invention.

As described above, the projection apparatus includes a plurality of light sources for projecting different emission light wavelengths and implemented with a plurality of spatial light modulators according to the present embodiment can effectively suppress an occurrence of a color break Note that the individual adjustable light sources must be controlled to project light pulses in high speed by controlling the adjustable light sources as described above. Therefore, it is preferred to configure a circuit layout for forming the light source drive circuit, or an output-stage circuit for performing a high speed current drive for the light source drive circuit and a control circuit, in close proximity with each other and near the individual light sources for reducing the floating capacity and parasite impedance associated with the wiring of individual circuits.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

What is claimed is:

1. A projection apparatus using a spatial light modulator (SLM), comprising:
   a light source for projecting lights with at least two different wavelengths;
   a light source control circuit for controlling the light source by a pulse modulation to emit the lights as modulated pulses;
   at least two spatial light modulators each comprising an array of pixel elements;
   a spatial light modulator control circuit for selectively controlling a modulation state of the respective pixel elements in each of the spatial light modulators in accordance with image data corresponding to the respective pixel elements; wherein the light source control circuit controls a starting timing of a pulse emission period of the modulated pulses of at least one of the wavelengths emitted from the light source, and wherein the starting timing of the pulse emission period differs from a modulation control timing of each pixel element of the each of the spatial light modulators.

2. The projection apparatus according to claim 1, wherein:
   the light source control circuit controls the light source to emit a pulse emission modulated with a pulse width smaller than a modulation period of the each of the spatial light modulators.

3. The projection apparatus according to claim 1, wherein:
   the spatial light modulator control circuit controls the respective pixel elements to maintain a designated modulation state during the respective pulse emission period.

4. The projection apparatus according to claim 1, wherein:
   the light source control circuit controls the light source for emitting the modulated pulses with a pulse width smaller than a minimum modulation period of the each of the spatial light modulators in every pulse emission period.

5. The projection apparatus according to claim 1, wherein:
   the light source control circuit controls the light source to emit the modulated pulses with coincident starting timings and/or ending timings of the pulse emission periods of all of the wavelengths emitted from the light source.

6. The projection apparatus according to claim 1, wherein:
   the light source control circuit controls the light source to change a pulse emission state for at least one of the wavelengths in at least one pulse emission period.

7. The projection apparatus according to claim 1, wherein:
   the light source control circuit controls the light source to change a pulse emission state in the pulse emission periods corresponding to the respective wavelengths emitted from the light source.

8. The projection apparatus according to claim 1, wherein:
   the spatial light modulator control circuit divides each frame period corresponding to the image data into a plurality of sub-frame periods in which the each of the spatial light modulators maintains one modulation state, and
   the light source control circuit controls the light source to emit at least one pulse emission within each sub-frame period.

9. The projection apparatus according to claim 1, wherein:
   the spatial light modulator control circuit divides a frame into sub-frames with a number of sub-frames equal to or more than a number of gray-scale bits of image data corresponding to the respective wavelengths of the light source, and
   the light source control circuit controls the light source to emit the light with an integrated light intensity of pulse emission in all the sub-frames periods corresponding to respective gray-scale bits of the image data with a ratio equal to a ratio of a bit weight of respective gray-scale bits.

10. A projection apparatus according to claim 1, wherein:
    the light source control circuit and at least a part of the spatial light modulator control circuit are mounted on a same semiconductor chip or on a same circuit board.

11. A projection apparatus according to claim 1, wherein:
    the light source control circuit comprises a light source drive circuit for driving the light source, and the light source and at least a part of the light source drive circuit are mounted on a same semiconductor chip or a same circuit board.

12. The projection apparatus according to claim 1, wherein:
    the each pixel element is a mirror element for modulating an illumination light from the light source, having modulation states including an ON state for reflecting a reflected light of the illumination light directed to a projection light path, an OFF state for reflecting the illumination light away from the projection light path, and an oscillation state for oscillating the mirror element between the ON state and OFF state.

13. A projection apparatus according to claim 1, wherein:
    the spatial light modulator control circuit controls the spatial light modulator in a plurality of control periods including different modulation states of the each pixel element in each frame period, and
    the light source control circuit controls the pulse modulation of the light source to change a pulse emission state in at least one of the control periods.

14. The projection apparatus according to claim 1, wherein:
    the spatial light modulator control circuit converts the image data from binary data to non-binary data, and controls the each of the spatial light modulators in accordance with the non-binary data.

15. The projection apparatus according to claim 1, wherein:
    the light source comprises a semiconductor light source further comprising a plurality of sub-light sources arranged in an array.

16. The projection apparatus according to claim 1, wherein:
    the light source control circuit controls and adjusts a pulse emission state of the respective wavelengths in the light source in accordance with a human visibility with respect to the respective wavelengths.

17. A projection apparatus using a spatial light modulator (SLM), comprising:
a light source emitting a light with at least two different wavelengths;
a light source control circuit for controlling the light source to emit the light as pulse emissions;
at least two spatial light modulators each comprising a plurality of pixel elements arranged in an array;
a spatial light modulator control circuit for selectively controlling a modulation state of the respective pixel elements in each of the spatial light modulators in accordance with image data corresponding to the respective pixel elements; wherein
the light source control circuit controls the light source to control both a turn-on timing and a turn-off timing, or either the turn-on timing or the turn-off timing, of a pulse emission of at least one of the wavelengths, and wherein the turn-on timing and/or the turn-off timing are/is different from a modulation control timing of each pixel element of the each of the spatial light modulators.

18. The projection apparatus according to claim 17, wherein:
the spatial light modulator control circuit controls the respective pixel elements in each of the spatial light modulators to maintain a designated modulation state at least during a period when pulse emissions of the respective wavelengths in the light source overlap.

19. The projection apparatus according to claim 17, wherein:
the light source control circuit controls the light source to change a pulse emission state in the pulse emission periods corresponding to the respective wavelengths in the light source.

20. The projection apparatus according to claim 17, wherein:
the spatial light modulator control circuit divides each frame period corresponding to the image data into a plurality of sub-frame periods when the each of the spatial light modulators maintains one modulation state, and
the light source control circuit controls the light source to emit at least one pulse emission within each sub-frame period.

21. The projection apparatus according to claim 17, wherein:
the spatial light modulator control circuit divides a frame into sub-frames with a number of sub-frames equal to or more than a number of gray-scale bits of image data corresponding to the respective wavelengths of the light source, and
the light source control circuit controls the light source to emit pulse emissions with integrated light intensity of pulse emission in each of the sub-frames periods corresponding to respective gray-scale bits of the image data has a ratio equal to a ratio of a bit weight of the respective gray-scale bits.

22. The projection apparatus according to claim 17, wherein:
the light source control circuit and at least a part of the spatial light modulator control circuit are mounted on a same semiconductor chip or on a same circuit board.

23. The projection apparatus according to claim 17, wherein:
the light source control circuit comprises a light source drive circuit for driving the light source, and
the light source and at least a part of the light source drive circuit are mounted on a same semiconductor chip or a same circuit board.

24. The projection apparatus according to claim 17, wherein:
the each pixel element comprises a mirror element for modulating and reflecting an illumination light from the light source, having modulation states including an ON state for reflecting a reflected light of the illumination light to a projection light path, an OFF state for reflecting the illumination light away from the projection light path, and an oscillation state for oscillating the mirror between the ON state and OFF state.

25. A projection apparatus according to claim 17, wherein:
the spatial light modulator control circuit controls the spatial light modulator to operate in a plurality of control periods including different modulation states of the each pixel element in each frame period, and
the light source control circuit controls the light source to change a pulse emission state in at least one of the control periods.

26. The projection apparatus according to claim 17, wherein:
the spatial light modulator control circuit converts the image data from binary data to non-binary data, and controls the each of the spatial light modulators in accordance with the non-binary data.

27. The projection apparatus according to claim 17, wherein:
the light source comprises a semiconductor light source further comprising a plurality of sub-light sources are arranged in an array.

28. The projection apparatus according to claim 17, wherein:
the light source control circuit controls and adjusts a pulse emission state of the respective wavelengths in the light source in accordance with a human visibility with respect to the respective wavelengths.

* * * * *